US007950793B2

(12) United States Patent
Aruga et al.

(10) Patent No.: US 7,950,793 B2
(45) Date of Patent: May 31, 2011

(54) RECORDING INK, INK CARTRIDGE, INK RECORD, INKJET RECORDING APPARATUS AND INKJET RECORDING PROCESS

(75) Inventors: Tamotsu Aruga, Isehara (JP); Kiyofumi Nagai, Machida (JP)

(73) Assignee: Ricoh Company, Ltd., Tokyo (JP)

( * ) Notice: Subject to any disclaimer, the term of this patent is extended or adjusted under 35 U.S.C. 154(b) by 558 days.

(21) Appl. No.: 11/547,797

(22) PCT Filed: Apr. 6, 2005

(86) PCT No.: PCT/JP2005/007107
§ 371 (c)(1),
(2), (4) Date: Mar. 9, 2007

(87) PCT Pub. No.: WO2005/097921
PCT Pub. Date: Oct. 20, 2005

(65) Prior Publication Data
US 2007/0221079 A1    Sep. 27, 2007

(30) Foreign Application Priority Data

Apr. 8, 2004   (JP) ................. 2004-114289
Apr. 8, 2004   (JP) ................. 2004-114305

(51) Int. Cl.
    *C09D 11/00*    (2006.01)
(52) U.S. Cl. ..................... 347/100; 106/31.13
(58) Field of Classification Search .......... 347/100; 106/31.13
See application file for complete search history.

(56) References Cited

U.S. PATENT DOCUMENTS

| | | | |
|---|---|---|---|
| 5,477,255 A * | 12/1995 | Huth ........................ 347/87 |
| 5,883,157 A | 3/1999 | Yamashita et al. |
| 6,332,675 B1 * | 12/2001 | Koitabashi et al. ........ 347/86 |
| 6,540,329 B1 * | 4/2003 | Kaneko et al. ............ 347/43 |
| 2004/0055508 A1 * | 3/2004 | Miyamoto et al. ....... 106/31.47 |

FOREIGN PATENT DOCUMENTS

| | | |
|---|---|---|
| EP | 0 864 437 A1 | 9/1998 |
| EP | 0 953 613 A2 | 11/1999 |
| EP | 1 247 845 A1 | 10/2002 |
| EP | 1 256 607 A2 | 11/2002 |
| EP | 1 262 529 A1 | 12/2002 |
| JP | 9-157564 | 6/1997 |
| JP | 2000313830 A * | 11/2000 |

(Continued)

OTHER PUBLICATIONS

U.S. Appl. No. 11/623,928, filed Jan. 17, 2007, Aruga, et al. Office Action issued Mar. 29, 2011, in Japanese Patent Application No. 2005-111850, filed Apr. 8, 2005.
Office Action issued Mar. 29, 2011, in Japanese Patent Application No. 2005-086178, filed Mar. 24, 2005.

*Primary Examiner* — Laura E Martin
(74) *Attorney, Agent, or Firm* — Oblon, Spivak, McClelland, Maier & Neustadt, L.L.P.

(57) ABSTRACT

The object of the present invention is to provide a recording ink having excellent color developing properties and high delivery stability, by which not only the color saturation of the obtained image can be remarkably improved, but also the image having a high quality can be formed. For this object, the present invention provides a recording ink used for an inkjet recording using a dye ink and a pigment ink properly alternately through one inkjet head, wherein the dye ink and the pigment ink have respectively a viscosity at 25° C. of 5 mPa·s or more and the difference between the viscosity of the dye ink and the viscosity of the pigment ink is 3 mPa·s or less.

25 Claims, 13 Drawing Sheets

FOREIGN PATENT DOCUMENTS

| | | |
|---|---|---|
| JP | 2002 60665 | 2/2002 |
| JP | 2003 96345 | 4/2003 |
| JP | 2003 105236 | 4/2003 |
| JP | 2003 176432 | 6/2003 |
| JP | 2003-200582 | 7/2003 |
| JP | 2003-205619 | 7/2003 |
| JP | 2003 268274 | 9/2003 |
| JP | 2003268274 A * | 9/2003 |
| JP | 2004-010640 | 1/2004 |
| WO | 01 85856 | 11/2001 |

\* cited by examiner

RECORDING INK, INK CARTRIDGE, INK RECORD, INKJET RECORDING APPARATUS AND INKJET RECORDING PROCESS

Technical Field

The present invention relates to a recording ink used preferably for the inkjet recording and an ink cartridge, an ink record, an inkjet recording apparatus and an inkjet recording process which are provided using the recording ink.

Background Art

Since the inkjet printer according to the inkjet recording system can print in the plain paper, can be easily colorized, has a small size and the cost and running cost thereof is low, recently, it has been rapidly spread widely. Generally, the recording ink used for the inkjet recording system is required to have properties, such as a color tone, image density and spread for obtaining a high image quality, the dissolve stability of the colorant for obtaining the reliability, the water resistance and light-resistance of the ink for securing the keeping quality of the recorded image and the quick drying properties of the ink for obtaining the speedup of the printing and for satisfying these properties, various proposals are made. For example, in Japanese Patent Application Laid-Open (JP-A) No. 2003-96345, a pigment ink having a relative high viscosity is proposed. Particularly when with this ink, the printing is performed in a plain paper in high speed, the feathering and the color bleeding is rarely caused and a high quality image having an advantageous color tone can be obtained.

However, while this proposed pigment ink has a relative high glossiness as a pigment ink, when using this ink, the printing is performed in a glossy paper, this ink has such a disadvantage that this ink has yet a poorer glossiness in a glossy paper than that of a dye ink. Thus, it is required that if desired, the printing is performed using the dye ink and it is desired that the printing is performed using the pigment ink and dye ink properly alternately.

When the printing is performed using the pigment ink and the dye ink properly alternately through one inkjet head, since the dye ink which is a solution and the pigment ink which is a dispersion have different properties from each other, it is unknown that from the viewpoint of the image quality and the injection stability, which properties of an ink set are preferred.

Further, since the dye has a limit in the saturated solubility and affects adversely the show-through, it is not always easy to prepare a dye ink having the same high viscosity as that of the pigment ink. In the case where the printing is performed using the dye ink and pigment ink properly alternately, the segmentation of the colorant should be prevented. For this object, a dye ink which can be used alternately with a pigment ink having a specified pH is proposed in Japanese Patent Application Laid-Open (JP-A) No. 2002-60665. However in this proposal, there is the viscosity of the dye ink neither disclosed nor indicated and judging the material of the dye ink, the dye ink has a high surface tension and has not satisfactory properties for the image quality.

Recently, an inkjet recording apparatus by which the printing using a pigment ink having a high viscosity can be performed (manufactured and sold by Ricoh Company, Ltd; trade name: Ricoh IPSiO G 707 and G 505) are developed.

It is conventional that using these recording apparatus, the pigment ink is printed; however it is neither disclosed nor indicated that using these recording apparatus, the dye ink is printed and the detail with respect to a dye ink which can be stably fed and printed is not yet studied.

On the other hand, while the dye ink is excellent in water-solubility, the water-solubility of the dye ink is limited (cf., the pigment ink which is a dispersion can be used irrespective the water-solubility thereof), so that in the case where a dye ink having a high density is used, when a volatile component of the ink is vaporized and the ink is dried up, the ink is crystallized and adheres solidly sometimes to other materials. Particularly when the dye ink adheres solidly in the receiver for the blanc-delivery by which the dirt in the ink nozzle is blown out after the wiping during the cleaning procedure of the dirt in the inkjet head, it is not easy to remove the dirt.

Accordingly, since with respect to the dye ink (as a difference from the pigment ink), the saturated water-solubility of the dye is limited and the image printed using the dye ink has a large show-through in comparison with the pigment ink, the selecting of a material by which the dye ink can be rendered to have a high viscosity is limited and the developing of a dye ink having a high viscosity has been not yet proceeded, so that the prompt development thereof is desired nowadays.

Disclosure Of Invention

The first object of the present invention is to provide a recording ink having excellent color developing properties and high delivery stability, by which not only an optimal combination of ink properties for the inkjet recording performed using a dye ink and a pigment ink properly alternately through one inkjet head can be obtained and the color saturation of the obtained image can be remarkably improved, but also the image having a high quality can be formed; and an ink cartridge, ink record, inkjet recording apparatus and inkjet recording process using the above-noted recording ink.

The second object of the present invention is to provide a recording ink comprising a dye ink having a high viscosity, which is used for an inkjet recording apparatus comprising an inkjet head having a train of nozzles, a sub tank feeding the ink to the inkjet head, a negative-pressure generating unit which generates a negative pressure in the sub tank, an opening unit to the atmosphere by which the inside of the sub tank is opened to the atmosphere and a detecting unit by which the presence of the ink is detected by the difference in the electric resistance.

The recording ink according to the present invention in the first aspect comprises a dye ink and a pigment ink which are used properly alternately through one inkjet head in an inkjet recording, wherein the dye ink and the pigment ink have respectively a viscosity at 25° C. of 5 mPa·s or more and the difference between the viscosity of the dye ink and the viscosity of the pigment ink is 3 mPa·s or less. Accordingly, the above-noted recording ink has stable injection properties and by the above-noted recording ink, an image having a high image quality can be formed.

In this aspect, as the pigment ink, a pigment ink comprising at least water, a pigment, a wetting agent, a surfactant, and a $C_8$ to $C_{11}$ polyol compound or a glycol ether compound, and a surfactant and having a viscosity at 25° C. of 5 mPa·s or more and a surface tension at 25° C. of 40 mN/m or less, is used. Accordingly, an image having a little show-through and no spread can be obtained. As the dye ink, a dye ink comprising water, a dye, a wetting agent, a viscosity-enhancing agent, and a $C_8$ to $C_{11}$ polyol compound or a glycol ether compound and having a viscosity at 25° C. of 5 mPa·s or more and a surface tension at 25° C. of 40 mN/m or less, is used. Accordingly, a dye ink which not only is dried rapidly after the printing, has a little spread and bleeding and can exhibit glossy feeling in a glossy paper, but also is excellent in injection stability, can be obtained.

The recording ink according to the present invention in the second aspect comprises a dye ink having a viscosity at 25° C. of 5 mPa·s or more and a surface tension at 25° C. of 40 mN/m or less, wherein the recording ink is used for an inkjet recording apparatus comprising an inkjet head having a train of nozzles, a sub tank feeding the ink to the inkjet head, a negative-pressure generating unit which generates a negative pressure in the sub tank, an opening unit to the atmosphere by which the inside of the sub tank is opened to the atmosphere and a detecting unit by which the presence of the ink is detected through the difference in the electric resistance. Accordingly, even when a dye ink having a high viscosity is used, not only the recording ink is dried rapidly after the printing, has a little spread and bleeding and can exhibit glossy feeling in a glossy paper, but also the recording ink is excellent in injection stability and can form an image having a high image quality.

The ink cartridge according to the present invention comprises the recording ink according to the above-noted first and second aspects of the present invention contained in a container and is preferably used for the printer of an inkjet recording system. By recording using the above-noted ink contained in the ink cartridge, the recording ink is excellent in color developing properties, has a high delivery stability, can improve remarkably color saturation and can form a high-quality image.

The inkjet recording apparatus according to the present invention comprises at least an ink ejecting unit by which to the recording ink according to the first and second aspects of the present invention, an energy is applied and the recording ink is ejected for forming the image. In the inkjet recording apparatus according to the present invention, the ink ejecting unit applies an energy to the recording ink according to the present invention and ejects the recording ink for forming the image. Therefore, by using the dye ink and the pigment ink properly alternately, the recording ink is excellent in color developing properties, has a high delivery stability, can improve remarkably color saturation and can form a high-quality image. Further, it is preferred that the dye ink comprises an anti-forming agent, so that in the sub tank equipped with a detecting unit of the presence of the ink by which the presence of the ink is detected according to the difference in the electric resistance, the presence of the ink can be stably detected. For the case where the dye ink adheres solidly in the receiver for the blanc-delivery, it is preferred that in the receiver for the blanc-delivery, a scraping unit which is a wiper or a cutter is provided, so that an adhered dye ink can be effectively scraped off.

The inkjet recording process according to the present invention comprises at least the ejecting of a recording ink by which to the recording ink according to the first and second aspects of the present invention, an energy is applied and the recording ink is ejected for forming the image. In the ink ejecting of the inkjet recording process according to the present invention, to the recording ink according to the present invention, an energy is applied and the recording is ejected, thereby forming the image. Accordingly, by using the dye ink and the pigment ink properly alternately, the recording ink is excellent in color developing properties, has a high delivery stability, can improve remarkably color saturation and can form a high-quality image.

The ink record according to the present invention comprises the image formed on a recording medium using the recording ink according to the first and second aspects of the present invention. In the ink record, the recording ink is excellent in color developing properties, has high delivery stability, can improve remarkably color saturation and can hold a high-quality image in the recording medium.

In the application specification of the present invention, "through one inkjet head" means that in the case where the printing is performed using the dye ink and the pigment ink properly alternately in the inkjet recording apparatus, as the inkjet head, the same one inkjet head is used. However, the above-noted case includes cases where as another part of the inkjet recording apparatus, a part used specifically for the printing using the dye ink and a part used specifically for the printing using the pigment dye are alternately used, such as a case where a cartridge is specifically used for the printing using the dye ink and another cartridge is specifically used for the printing using the pigment ink. The case where a cartridge is specifically used for the printing using the dye ink and another cartridge is specifically used for the printing using the pigment ink, include a case where after the printing using only the pigment ink, the same cartridge is filled with the dye ink and the printing is performed (a case where at this time, the cartridge is cleaned, is also included). In summary, the case represented by "through one inkjet head" includes all cases where the pigment ink and the dye ink are mixed even in a slight amount in the ink path (including also "in the waste ink trap").

Figure 1:
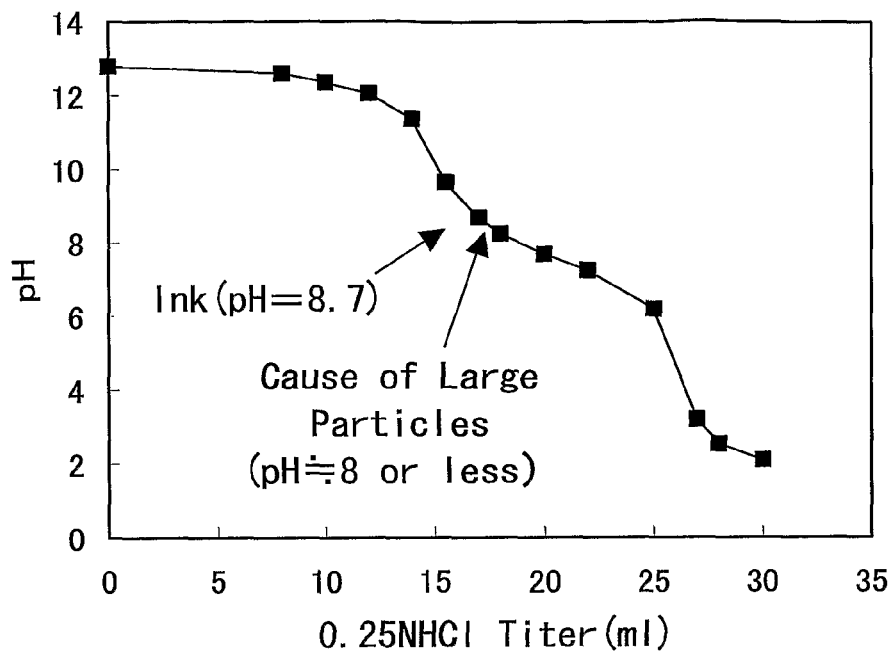
FIG. 1 is a graph showing an example of the titration curve for controlling the pH of a magenta pigment ink according to the present invention.

Best Mode For Carrying Out The Invention

Recording Ink

The recording ink according to the present invention in the first aspect is used for the inkjet recording using a dye ink and a pigment ink properly alternately through one inkjet head, wherein the dye ink and the pigment ink have respectively an ink viscosity at 25° C. of 5 mPa·s or more and the difference between the viscosity of the dye ink and the viscosity of the pigment ink is 3 mPa·s or less.

The recording ink according to the present invention in the second aspect is a recording ink used for an inkjet recording apparatus comprising an inkjet head having a train of nozzles, a sub tank feeding the ink to the inkjet head, a negative-pressure generating unit which generates a negative pressure in the sub tank, an opening unit to the atmosphere by which the inside of the sub tank is opened to the atmosphere and a detecting unit by which the presence of the ink is detected by the difference in the electric resistance and the recording ink is a dye ink having a viscosity at 25° C. of 5 mPa·s or more and a surface tension at 25° C. of 40 mN/m or less. In the second aspect, an aspect in which the inkjet recording apparatus has a scraping unit which scrapes off an adhered ink into the receiver for the blanc-delivery and an aspect in which the scraping unit is any one of a wiper and a cutter, are preferred.

As the dye ink according to the second aspect of the present invention, the same dye ink as that in the recording ink according to the first aspect of the present invention can be used.

The dye ink and the pigment ink have a viscosity at 25° C. of 5 mPa·s or more, preferably 8 mPa·s or more. When the viscosity is less than 5 mPa·s, the image density in the plain paper is lowered.

In the first aspect, the difference between the viscosity of the dye ink and that of the pigment ink is 3 mPa·s or less, more preferably 1 mPa·s or less. When the difference of viscosity is more than 3 mPa·s, it becomes difficult that under the same condition, both the dye ink and the pigment ink are caused to be stable particles. Depending on the cases, the viscosity of the dye ink is higher or lower than that of the pigment ink. When the viscosity of the dye ink is higher than that of the pigment ink, the above-noted difference of the viscosity is represented by the equation: (Difference of the viscosity=Viscosity of the dye ink−Viscosity of the pigment ink). On the other hand, when the viscosity of the dye ink is lower than that of the pigment ink, the above-noted difference of the viscosity is represented by the equation: (Difference of the viscosity=Viscosity of the pigment ink−Viscosity of the dye ink).

The viscosity can be measured using, for example a rotating viscometer in the form of a conical plate.

The difference (pH B−pH A) between the pH (pH A) of the pigment ink and the pH (pH B) of the dye ink is preferably −1 to 2.

After the pH of the pigment ink was rendered to be high by adding an alkali to the ink, the pigment ink having a high pH was titrated with an acid having a proper concentration (which is adjusted according to the concentration of the ion-dissociated fraction), thereby obtaining a titration curve.

More specifically, after the pH of 50 g of a magenta pigment ink in the below-noted Preparing Example 1 was elevated with sodium hydroxide, the magenta pigment ink was titrated with a 0.25 N HCl solution. The result of the titration is shown in Table 1.

As the result shown in Table 1, the magenta pigment ink has the ion dissociation constant at around a pH of 7.5 to 7.7 and has a pH buffer region at least in the pH region of from 6 to 9. In other words, at around pH 7.5, the half of the hydrophilic groups of the pigment dispersion is undissociated.

The initial pH of the measured magenta pigment ink was 8.7 and it was confirmed that when pH of the ink becomes 8 or less, the number of particles having a large particle diameter becomes more. It was also confirmed that at pH of 6 or less (i.e., lower than the lower limit of the above-noted pH buffer region), all particles are fully precipitated. A cause thereof is that the magenta pigment ink has originally a high pigment concentration and a high viscosity. Therefore, while when the magenta pigment ink is attached to a paper, by a component of the paper, the magenta pigment ink is swiftly rendered to large particles (gelatinized), so that the large particles of the pigment ink is advantageous for the image having a high image quality, when the magenta pigment ink is reacted with a compound lowering the pH of the reaction partner, a disadvantage is caused wherein large particles of the ink are rapidly precipitated in the ink path.

Figure 2:
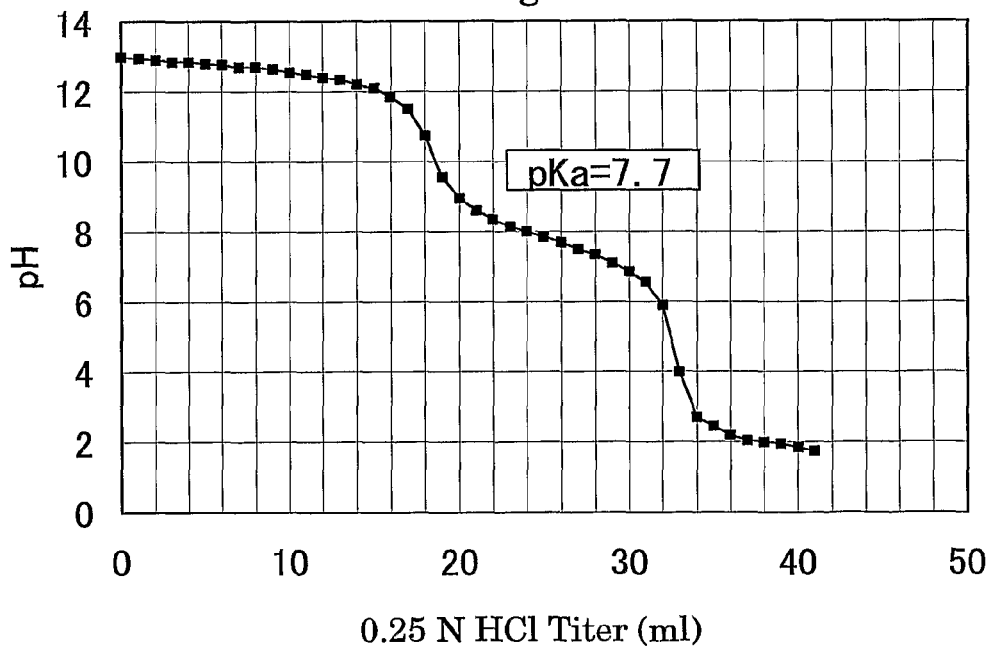
FIG. 2 is a graph showing an example of the titration curve for controlling the pH of a yellow pigment ink according to the present invention.

Further, the pH-buffer properties of the yellow pigment ink are similar to those of the magenta pigment ink (see FIG. 2). Also, the cyan pigment ink has similar pH-buffer properties.

Figure 3:
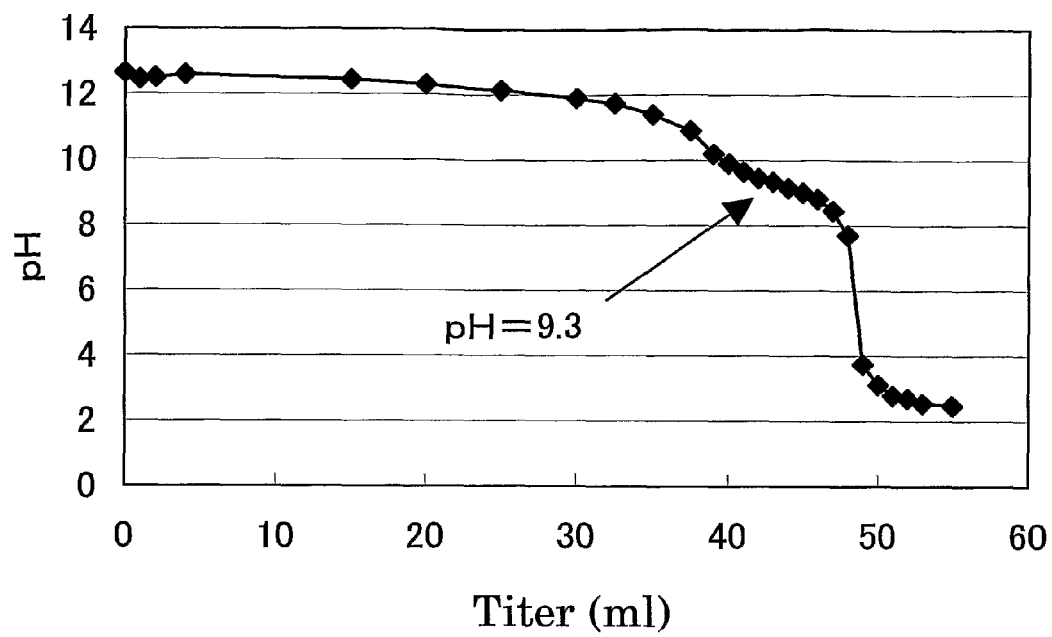
FIG. 3 is a graph showing an example of the relationship between the amount of the titer and pH.

As shown in FIG. 3, for example a dye ink having the ion dissociation constant at pH of 9.3 (e.g., a yellow dye ink in Preparing Example 2 in Examples) has buffer properties until at least around pH of 7.5 and when a dye ink used properly alternately with a pigment ink, which has a pH which is lower than pH 8.7 of a pigment ink is mixed with the above-noted pigment ink having pH of 8.7, a proton is transferred to the pigment ink, so that the solubility of the pigment ink is lowered. On the contrary, when the above-noted dye ink has a higher pH than that of the above-noted pigment ink, the dye ink does not precipitate the pigment ink in the mixing of these two inks, so that such a dye ink can be used properly alternately with such a pigment ink. The dye ink has a proper solubility in a lower pH side or higher pH side of the above-noted pH buffer region (since the dye ink has a sulfon group which is ion-dissociated at a much lower pH). However, considering the liquid-contacting properties of the inkjet head member, pH of the dye ink may not be much higher.

From the above-noted viewpoints, with respect to the recording ink according to the present invention, the difference (pH B−pH A) between the pH (pH A) of the pigment ink and the pH (pH B) of the dye ink is preferably −1 to 2, more preferably 0 to 2. When the difference of pH is −1 to 2, in the case where the recording ink according to the present invention is used for the inkjet recording using the dye ink and the pigment ink properly alternately through one inkjet head, not only the precipitation in the ink path is prevented, but also it is prevented that during an opportune ink delivery for the stable ink delivery, the ink is precipitated and can difficultly flow in the receiver for the blanc-delivery.

pH of the dye ink (pH B) is preferably higher than pH of the pigment ink (pH A). When the pH of the dye ink (pH B) is higher than the pH of the pigment ink (pH A), such a risk is more reliably prevented that the precipitation is caused in the ink path and during an opportune ink delivery for the stable ink delivery, the ink is precipitated and can difficultly flow in the receiver for the blanc-delivery. In other words, even when the difference of pH is −1 to 0, such a dye ink and such a pigment ink can be used properly alternately; however, the difference of pH is preferably 0 or more.

As noted above, since the pigment ink according to the present invention has pH buffer properties in a pH region of 6 to 9 and in this pH region, the dispersion properties of the pigment ink are varied, it is necessary that pH of the dye ink is specified. The ink having pH buffer properties in a pH region of 6 to 9 and varying the dispersion properties thereof in the pH region has advantageous dispersion properties in an alkali region of pH and has such an effect that after the attaching of the ink to the paper surface, particles of the ink are swiftly agglomerated even in a neutral region of pH, so that the image quality becomes advantageous.

The surface tension at 25° C. of the pigment ink and of the dye ink respectively is preferably 40 mN/m or less, more preferably 35 mN/m or less. When the surface tension is more than 40 mN/m, the drying rate of the image in the plain paper becomes low, so that feathering and show-through are easily caused and further, the ink in the receiver for the blanc-delivery can difficultly flow and can easily stay in the receiver, so that a disadvantage is caused wherein the ink can difficultly flow to the waste ink tank.

Here, the surface tension can be measured using, for example a surface tension measuring apparatus (manufactured and sold by Kyowa Interface Science Co., Ltd.; trade name: CBVP-Z) according to the platinum plate method.

The pigment ink by which no spread of the ink is caused and the printed image has a high density during printing using the pigment ink in the plain paper and which can be dried in high speed during printing using the pigment ink in the plain paper, has preferably properties, such as an ink viscosity at 25° C. of 5 mPa·s or more and a surface tension at 25° C. of 40 mN/m or less.

Using the pigment ink having the above-noted properties (the viscosity at 25° C. is 8 mPa·s) instead of the dye ink and an experimental printing apparatus according to the piezo method, the printing was performed. A conventional dye ink for the inkjet printing has usually a viscosity of 5 mPa·s or less. Thus, a dye ink having a viscosity of 3 mPa·s was prepared and after the printing using the pigment ink, the experimental printing using the prepared dye ink instead of the pigment ink through the same inkjet head was performed. As the result of the experimental printing, the rendering to large particles was destabilized. Particularly, when experimentally, several drops of the dye ink having the viscosity of 3 mPa·s were injected in a high speed and attached to the paper as particles having a large size which was produced by integrating the above-noted several drops to one drop before the attaching of the ink to the paper, the several drops could not be integrated to one drop and the form of the dot of the image had a large distribution.

Further, using a driving wave pattern for injecting stably the pigment ink having a viscosity of 5 mPa·s, an experimental printing using the dye ink having a viscosity at −25° C. of 3 mPa·s was performed and as the result of the experimental printing, the printing by integrating a small ink drop to a large ink drop could be stably performed. On the other hand, using a driving wave pattern for injecting stably the pigment ink having a viscosity of 8 mPa·s, an experimental printing using the dye ink having a viscosity at 25° C. of 5 mPa·s was performed and as the result, the printing could be stably performed. Thus, when the difference of the viscosity between the pigment ink and the dye ink is 4 mPa·s to 5 mPa·s or more, it was difficult that the dye ink and the pigment ink are alternately injected stably through one inkjet head.

With respect to the image quality, by the printing with the dye ink having the viscosity of 3 mPa·s using a driving wave pattern for injecting the pigment ink having the viscosity of 8 mPa·s, the amount of the used ink was too large, so that the density of the image in a glossy paper was too large and the image was wholly relative dark. In the image printed using the dye ink in the plain paper, the show-through (which means a phenomenon in which the image can be recognized from the reverse surface of the paper) may be caused at any rate more often than in the image printed using the pigment ink. Accordingly, for lessening the occurrence of the show-through, it is necessary that the viscosity of the dye ink is enhanced to 5 mPa·s or more (which is depending on the type of the material enhancing the viscosity of the dye ink). It is considered that to the cause for lessening the occurrence of the show-through by using the dye ink having a high viscosity, both the decrease of the amount of the ink and the solidification of the ink in a near layer of the paper from the surface of the paper after the attaching of the ink to the surface of the paper, contribute.

The using of the dye ink having such a low surface tension as 40 mN/m at 25° C. or less as the dye ink, is based on the fact that by using the above-noted dye ink, in almost all recording media, the ink can swiftly penetrate into the media and be dried swiftly. By using the above-noted dye ink, wetting properties of the dye ink to the ink head member are improved and even if the dye ink is the dye ink having such a high viscosity as 5 mPa·s or more (at 25° C.), the frequency-number responsibility of the ink is improved, so that the delivery stability of the dye ink is remarkably improved.

In this case, particularly it is a large problem that the pigment ink used properly alternately with the dye ink has a high viscosity and during the blanc delivery, the pigment ink is precipitated and set in the receiver for the blanc delivery. For solving this problem, it is effective that by using the dye ink having a low surface tension which can easily flow, the dye ink is not precipitated during the printing using the dye ink instead of the pigment ink.

Further, the using of the dye ink having such a high viscosity as 5 mPa·s or more has such an effect that by lessening a water content in the ink and enhancing the evaporation rate of water in the ink, the speed of the agglomeration of the dye in the surface of the paper is enhanced, so that the occurrence of the feathering is lessened.

The forming stability after 5 minutes of the dye ink according to JIS K3362 is preferably less than 30 mm, more preferably 10 mm or less. When the forming stability is 30 mm or more, the forming can difficultly disappear, so that the ink feeding action of the subtank is sometimes destabilized and the clogging of the ink path due to an air bubble is sometimes caused.

<Dye Ink>

As mentioned above, the dye ink is not restricted so long as the dye ink has the viscosity at 25° C. of 5 mPa·s or more and the surface tension at 25° C. of 40 mN/m or less and may be properly selected depending on the application. The ink comprises at least water, a dye, a wetting agent, a viscosity enhancing agent, and a $C_8$ to $C_{11}$ polyol compound or a glycol ether compound and optionally comprises other component(s).

Dye

Examples of the dye include an acidic dye, a direct dye, a basic dye and a reactive dye.

The acidic dye is not restricted and may be properly selected depending on the application. Examples of the acidic dye include a conventional dye for the food. Specific examples of the acidic dye include C. I. Acid Yellow 17, 23, 42, 44, 79 and 142; C. I. Acid Red 1, 8, 13, 14, 18, 26, 27, 35, 37, 42, 52, 82, 87, 89, 92, 97, 106, 111, 114, 115, 134, 186, 249, 254 and 289; C. I. Acid Blue 9, 29, 45, 92 and 249; C. I. Acid Black 1, 2, 7, 24, 26 and 94; C. I. Food Yellow 2, 3 and 4; C. I. Food Red 7, 9 and 14; and C. I. Food Black 1 and 2.

The direct dye is not restricted and may be properly selected depending on the application. Examples of the direct dye include C. I. Direct Yellow 1, 12, 24, 26, 33, 44, 25 50, 86, 120, 132, 142 and 144; C. I. Direct Red 1, 4, 9, 13, 17, 20, 28, 31, 39, 80, 81, 83, 89, 225 and 227; C. I. Direct Orange 26, 29, 62 and 102; C. I. Direct Blue 1, 2, 6, 15, 22, 25, 71, 76, 79, 86, 87, 90, 98, 163, 165, 199 and 202; C. I. Direct Black 19, 22, 32, 38, 51, 56, 71, 74, 75, 77, 154, 168 and 171.

The basic dye is not restricted and may be properly selected depending on the application. Examples of the basic dye include C. I. Basic Yellow 1, 2, 11, 13, 14, 15, 19, 21, 23, 24, 25, 28, 29, 32, 36, 40, 41, 45, 49, 51, 53, 63, 64, 65, 67, 70, 73, 77, 87 and 91; C. I. Basic Red 2, 12, 13, 14, 15, 18, 22, 23, 24, 27, 29, 35, 36, 38, 39, 46, 49, 51, 52, 54, 59, 68, 69, 70, 73, 78, 82, 102, 104, 109 and 112; C. I. Basic Blue 1, 3, 5, 7, 9, 21, 22, 26, 35, 41, 45, 47, 54, 62, 65, 66, 67, 69, 75, 77, 78, 89, 92, 93, 105, 117, 120, 122, 124, 129, 137, 141, 147 and 155; and C. I. Basic Black 2 and 8.

The reactive dye is not restricted and may be properly selected depending on the application. Examples of the reactive dye include C. I. Reactive Black 3, 4, 7, 11, 12 and 17; C. I. Reactive Yellow 1, 5, 11, 13, 14, 20, 21, 22, 25, 40, 47, 51, 55, 65 and 67; C. I. Reactive Red 1, 14, 17, 25, 26, 32, 37, 44, 46, 55, 60, 66, 74, 79, 96 and 97; C. I. Reactive Blue 1, 2, 7, 14, 15, 23, 32, 35, 38, 41, 63, 80 and 95.

Among them, particularly the acidic dye and the direct dye are preferred and by using these dyes, for the improvement of the solubility stability, color tone, water resistance and light resistance of the ink, an excellent effect can be obtained.

The amount of the dye in the dye ink is preferably 4% by mass or more, more preferably 4% by mass to 15% by mass, based on the mass of the dye ink. When the amount is less than 4% by mass, the image density is easily lowered and a dye ink having a high viscosity which is an object of the present invention can be difficultly obtained sometimes.

The wetting agent (water-soluble organic solvent having a high boiling point) is not restricted and may be properly selected depending on the application. Examples of the wetting agent include glycerine, 1,3-butanediol, triethylene glycol, 1,6-hexanediol, propylene glycol, 1,5-pentanediol, diethylene glycol, diporpylene glycol, trimethylol propane, 1.1.1-tris(hydroxylmethyl)propane and trimethylol ethane. Among them, by using glycerine and another wetting agent than glycerine in combination, an ink having a high viscosity can be obtained.

The amount of the water-soluble organic solvent having a high boiling point in the dye ink is, when by increasing the amount of the wetting agent in the dye ink, the viscosity of the dye ink is enhanced, preferably 35% by mass to 50% by mass, based on the mass of the dye ink (see FIG. 16), with proviso that the viscosity of the dye ink is enhanced not by a viscosity enhancing agent. When the amount is less than 35% by mass, an objective dye ink having a high viscosity can be difficultly obtained and the ink-injection is sometimes destabilized, so that the effect of enhancing the viscosity of the dye ink for the image (increasing the image density) can not be sometimes obtained. On the other hand, when the amount is more than 50% by mass, the show-through in the plain paper is more frequently caused.

Viscosity Enhancing Agent

Examples of the viscosity enhancing agent include a surfactant having a molecular weight of 300 to 1,000, a resin and emulsion having a molecular weight of 1,000 ore more, a compound having a water-soluble portion, such as an ethylene oxide chain and a carboxyl group and a water-soluble compound having a thickening effect, such as an alginic acid compound. Since in the application specification of the present invention, a surfactant, an alginic acid, a resin and an emulsion are used for enhancing the viscosity of the dye, these compounds are sometimes referred to as "a viscosity enhancing agent".

Preferred examples of the surfactant include anionic surfactants or nonionic surfactants represented by the following formulae (1) to (6):

$$R^1-O-(CH_2CH_2O)_nCH_2COOM \quad \text{Formula (1)}$$

wherein $R^1$ represents an alkyl group, preferably a $C_6$ to $C_{14}$ alkyl group which may have a branched chain; M represents any one of an alkali metal ion, a quaternary ammonium ion, a quaternary phosphonium ion and an alkanolamine ion; and h is an integer of 3 to 12,

$$\begin{array}{c} CH_2COO-R^2 \\ | \\ MO_3SCHCOO-R^2 \end{array} \quad \text{Formula (2)}$$

wherein $R^2$ represents a $C_5$ to $C_{16}$ alkyl group having a branched group and M represents any one of an alkali metal ion, a quaternary ammonium ion, a quaternary phosphonium ion and an alkanolamine ion,

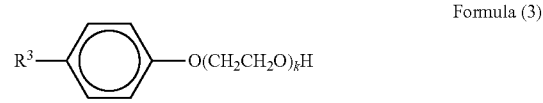

$$R^3-\langle\text{ }\rangle-O(CH_2CH_2O)_kH \quad \text{Formula (3)}$$

wherein R3 represents a hydrocarbon group, such as a $C_6$ to $C_{14}$ alkyl group which may have a branched group and k is an integer of 5 to 20,

$$R^4-(OCH_2CH_2)_jOH \quad \text{Formula (4)}$$

wherein $R^4$ represents a hydrocarbon group, such as a $C_6$ to $C_{14}$ alkyl group which may have a branched group and j is an integer of 3 to 20,

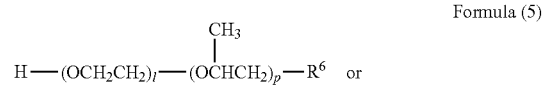

$$H-(OCH_2CH_2)_l-(OCHCH_2)_p-R^6 \quad \text{Formula (5)}$$
$$\qquad\qquad\qquad\qquad\quad | \qquad \text{or}$$
$$\qquad\qquad\qquad\qquad CH_3$$

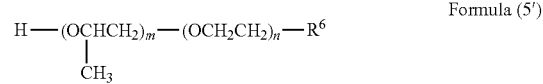

$$H-(OCHCH_2)_m-(OCH_2CH_2)_n-R^6 \quad \text{Formula (5')}$$
$$\quad\;\; | $$
$$\;\; CH_3$$

wherein $R^6$ represents a hydrocarbon group, such as a $C_6$ to $C_{14}$ alkyl group and L, m, n and p are individually an integer of 1 to 20,

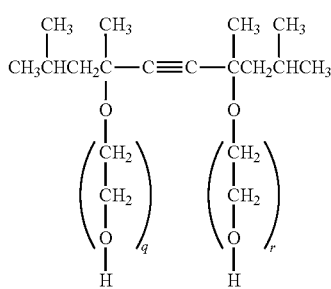

Formula (6)

wherein q and r are individually an integer of 0 to 40.

Figure 14:
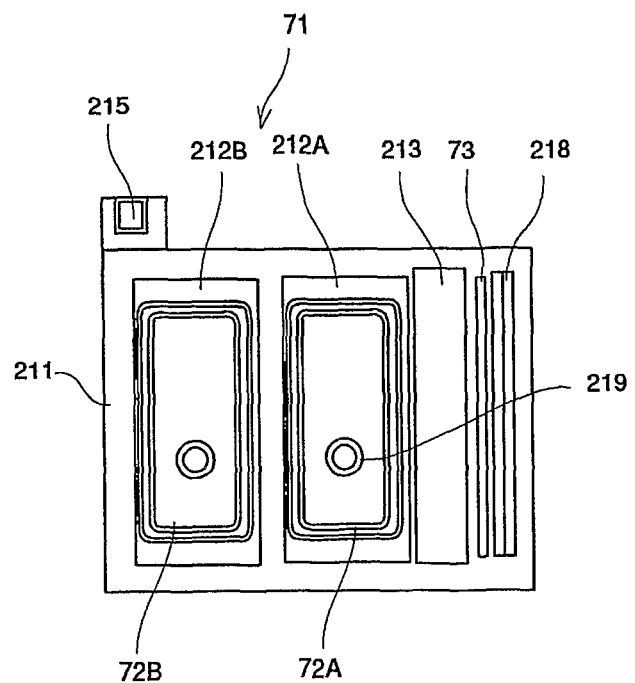
FIG. 14 is a top view schematically showing an example of the maintaining unit for the inkjet printer according to the present invention.
Figure 15:
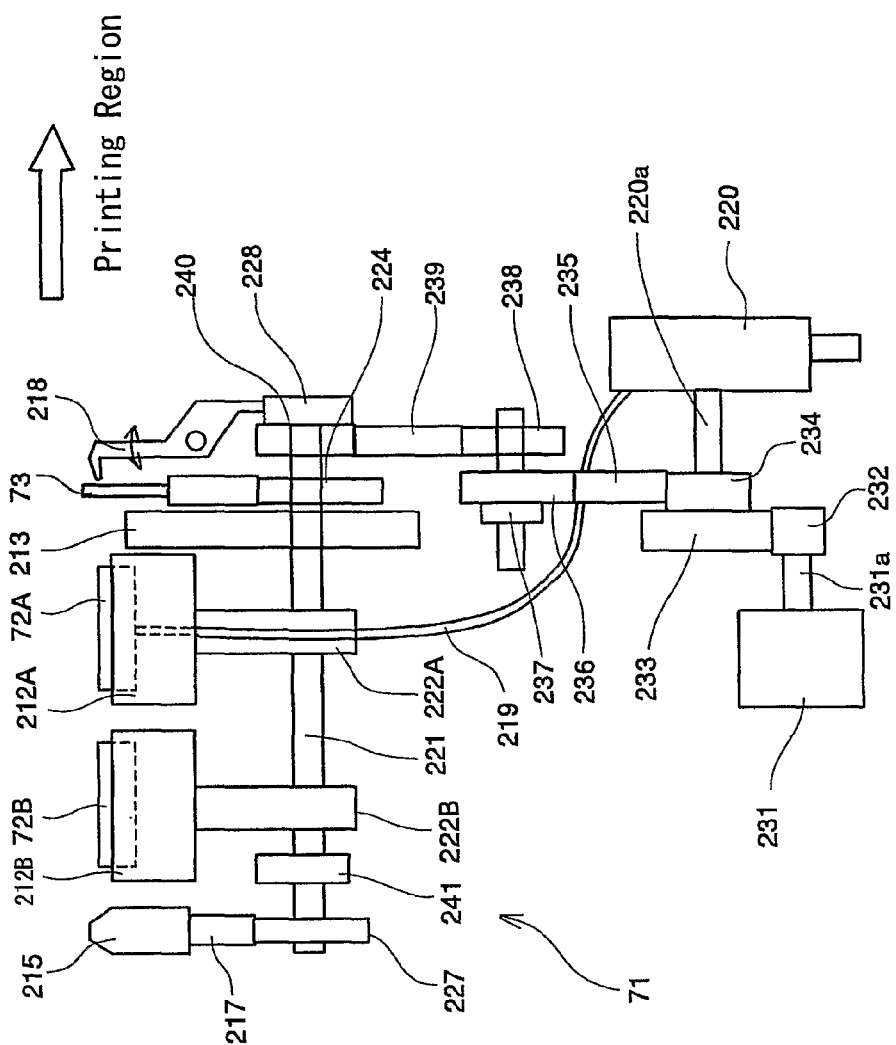
FIG. 15 is an explanatory view schematically showing an example of the maintaining unit for the inkjet printer according to the present invention.

When the amount of the wetting agent is a not so large amount (i.e., an usual amount, such as 15% by mass to 30% by mass), for enhancing the viscosity of the dye ink, the amount of the surfactant in the dye ink is preferably 7% by mass or more (see FIGS. 14 and 15). When the amount of the surfactant is less than 7% by mass, an objective high viscosity of the dye ink cannot be obtained. The using of the surfactant has such an advantage that when the printing is performed using a dye ink of which viscosity is enhanced by increasing the amount of the surfactant, the occurrence of the show-through of the printed image is suppressed.

A similar effect to the effect of viscosity-enhancing of the surfactant can be obtained by incorporating a water-soluble polymer resin having a water-soluble portion, such as a carboxyl group and an ethylene oxide group in the dye ink.

Examples of the alginic acid compound include an alginic acid and salts thereof. An alginic acid is a linear polysaccharide comprising two types of the uronic acid, such as β-(1→4)-D-mannuronic acid (hereinafter referred to as "M") and α-(1→4)-L-glucuronic acid (hereinafter referred to as "G") and a block heteropolymer in which three blocks, such as (1) M block comprising only a M-M linkage, (2) G block comprising only a G-G linkage and (3) random block in which M and G are randomly arranged coexist, wherein the M/G ratio varies depending on a species of an algae comprising the alginic acid, a season and a portion of the algae.

A carboxyl group which the above-noted M and G have can be easily ion-exchanged with various cations.

In other words, the properties of the alginic acid are remarkably changed in a water system depending on the type of the cation which is bonded to a carboxyl group of the alginic acid. Examples of the cation include a sodium ion, a potassium ion, a calcium ion, an aluminum ion and an ammonium ion and due to such a cation, the viscosity-enhancing and the gelation are caused. Taking advantage of such an effect, the alginic acid is utilized as a thickening agent, a gelatinizing agent, an emulsion stabilizer, a film forming agent, a shape retaining agent and a flocculating agent.

Examples of the salts of the alginic acid include a potassium salt, sodium salt and ammonium salt thereof and among them, a sodium salt thereof is preferred.

The alginic acid polymer is contained in a very large amount in an intercellular space of phaeophyceae, such as laminaria, laminaria japonica, undaria pinnatifida, sargassum fusiforme, ecklonia stolonifera and ecklonia cava. Therefore, according to a method comprising washing the phaeophyceae by a diluted sulfuric acid solution, extracting the washed phaeophyceae with a sodium carbonate solution and precipitating the alginic acid in the sodium carbonate solution with sulfuric acid, the alginic acid polymer can be obtained.

As the alginic acid, a commercially available product, such as an alginic acid having an ultra-low viscosity (manufactured and sold by Kibun Food Chemifa, Co., Ltd.) may be used.

When by increasing the amount of the alginic acid compound, the viscosity of the dye ink is enhanced, the amount of the alginic acid is preferably 4% by mass or less, more preferably 1 to 3% by mass, based on the mass of the dye ink.

$C_8$ to $C_{11}$ Polyol Compound or Glycol Ether Compound

Examples of the $C_8$ to $C_{11}$ polyol compound include 2-ethyl-1,3-hexanediol and 2,2,4-trimethyl-1,3-pentanediol.

Examples of the glycol ether compound include a polyalcohol alkyl ether, such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether and propylene glycol monoethyl ether; and a polyalcohol aryl ether, such as ethylene glycol monophenyl ether and ethylene glycol monobenzyl ether. The amount of the $C_8$ to $C_{11}$ polyol compound or glycol ether compound is preferably 0.1% by mass to 10.0% by mass, based on the total mass of the recording ink.

Anti-forming Agent

The anti-forming agent is not restricted and may be properly selected depending on the application. Preferred examples of the anti-forming agent include a silicone anti-forming agent, a polyether anti-forming agent and a fatty acid ester anti-forming agent. These anti-forming agents may be used individually or in combination. Among them, from the viewpoint of the excellence in the foam braking effect, a silicone anti-foaming agent is preferred.

Examples of the silicone anti-foaming agent include an oil silicone anti-foaming agent, a compound silicone anti-foaming agent, a self-emulsible silicone anti-foaming agent, an emulsion silicone anti-foaming agent and a modified silicone anti-foaming agent, such as an amino-modified silicone anti-foaming agent, a carbinol-modified silicone anti-foaming agent, a methacryl-modified silicone anti-foaming agent, a polyether-modified silicone anti-foaming agent, an alkyl-modified silicone anti-foaming agent, a higher fatty acid ester-modified silicone anti-foaming agent and an alkylene oxide-modified silicone anti-foaming agent. Among them, considering the applying of the silicone anti-foaming agent to the recording ink which is a hydrophilic medium, the self-emulsible silicone anti-foaming agent and the emulsion silicone anti-foaming agent are preferred.

As the anti-foaming agent, a commercially available product may be used. Examples of the commercially available product include a silicone anti-foaming agent (manufactured and sold by Shin-Etsu Chemical Co., Ltd.; trade name: KS-508,-531 and KM-72,-85), a silicone anti-foaming agent (manufactured and sold by Dow Corning Toray Silicone Co., Ltd.; trade name: Q2-3183A and SH5510), a silicone anti-foaming agent (manufactured and sold by Nippon Unicar Company Limited; trade name: SAG 30) and a silicone anti-foaming agent (manufactured and sold by Asahi Denka Co., Ltd.; trade name: Adekanate series).

The amount of the anti-foaming agent in the dye ink is not restricted and may be properly selected depending on the application. The amount is preferably 0.001% by mass to 3% by mass, more preferably 0.05% by mass to 0.5% by mass, based on the mass of the dye ink.

When the dye ink comprises the anti-foaming agent, the dye ink is particularly excellent in the shelf stability and the delivery stability. When the amount of the anti-foaming agent is less than 0.001% by mass, the effect of the anti-foaming agent is sometimes unsatisfactory. On the other hand, when the amount of the anti-foaming agent is more than 3% by mass, the clogging of the ink is easily caused, so that the reliability of the dye ink is sometimes impaired.

<Pigment Ink>

The pigment ink is not restricted so long as, as noted-above the pigment ink has a viscosity at 25° C. of 5 mPa·s or more and a surface tension at 25° C. of 40 mN/m or less and may be properly selected depending on the application. The pigment ink comprises at least water, a pigment, a wetting agent, a surfactant, and comprises a $C_8$ to $C_{11}$ polyol compound or a glycol ether compound, and optionally comprises other components.

Pigment

Preferred examples of the pigment include polymer fine particles comprising at least one of a water-insoluble colorant and a water-slight soluble colorant and a carbon black having at least one of hydrophilic groups in the surface thereof.

Here, it is not necessary that the whole colorant incorporated in the pigment ink is encapsulated in the polymer fine particles or adsorbed on the surface of the polymer fine particles and so long as the object and effect of the present invention is not impaired, the colorant may be dispersed in the emulsion. The colorant is not restricted so long as the colorant is water-insoluble or water-slight soluble and can be adsorbed on the polymer and may be properly selected depending on the application.

In the application specification of the present invention, "water-insoluble or water-slight soluble" means that the colorant cannot be dissolved in an amount of 10 parts by mass or more in 100 parts by mass of water at 20° C. "Being dissolved" means that in an upper layer or lower layer of the water, the separation or sedimentation of the colorant is not visually observed.

Examples of a polymer forming the above-noted emulsion include a vinyl polymer, a polyester polymer and a polyurethane polymer. Among them, most preferred examples of the polymer include the vinyl polymer and the polyester polymer and specific preferred examples of the polymer include polymers disclosed in JP-A Nos. 2000-53897 and 2001-139849.

Examples of the colorant as a black pigment include a carbon black. Examples of the colorant as a color pigment include a phthalocyanine blue, a phthalocyanine green, a quinacridone pigment, an anthraquinone pigment, a diazo pigment, a monoazo pigment, a pyranthrone pigment, a perylene pigment, a heterocyclic yellow, and a (thio) indigoid pigment. Examples of the phthalocyanine blue include a copper phthalocyanine blue and a derivative thereof (e.g., a pigment blue 15). Examples of the quinacridone pigment include C.I. Pigment Orange 48 and 49, C.I. Pigment Red 122, 192, 202, 206, 207 and 209, C.I. Pigment Violet 19 and 42. Examples of the anthraquinone pigment include C.I. Pigment Red 43, 194 (perinone red), 216 (brominated pyranthrone red) and 226 (pyranthrone red).

Examples of the perylene pigment include C.I. Pigment Red 123 (vermilion), 149 (scarlet), 179 (maroon) and 190 (red), C.I. Pigment Violet and C.I. Pigment Red 189 (yellow shade red) and 224. Examples of the (thio) indigoid include C.I. Pigment Red 86, 87, 88, 181 and 198 and C.I. Pigment Violet 36 and 38. Examples of the heterocyclic yellow include C.I. Pigment Yellow 117 and 138. Examples of the other proper coloring pigments include pigments described in the literature "The Color Index, the third edition (edited by The Society of Dyers and Colorists, 1982)". When the pigment is used as a colorant, for complementing or toning the color, the above-noted dye may be used in combination with the pigment.

For the black pigment ink, a self-dispersible color pigment which can be stably dispersed without using a dispersant having at least one hydrophilic group bonded to the surface of a carbon black directly or through another atom group, is preferably used. Accordingly, in comparison with a conventional ink, a dispersant for dispersing the carbon black in the ink is not necessary. The self-dispersible carbon black has preferably an ionity and preferred examples thereof include that charged anionically and that charged cationically.

Examples of the anionic hydrophilic group which is bonded to the surface of the carbon black include —COOM, —SO$_3$M, —PO$_3$HM, —PO$_3$M$_2$—SO$_2$NH$_2$ and —SO$_2$NHCOR, wherein M represents any one of a hydrogen atom, an alkali metal, an ammonium ion and an organic ammonium ion and R represents any one of a $C_1$ to $C_{12}$ alkyl group, a phenyl group which may have a substituent and a naphthyl group which may have a substituent. Among them, —COOM and —SO$_3$M, as the anionic hydrophilic group bonded to the surface of the carbon black in the color pigment, are preferred.

Examples of "M" in the above noted hydrophilic group include, as an alkali metal, lithium, sodium and potassium and, as an organic ammonium, a mono or trimethyl ammonium, a mono or triethyl ammonium and a mono or trimethanol ammonium. Examples of the method for obtaining the above-noted anionically charged color pigment, as a method for introducing —COONa group to the surface of the color pigment, include a method for subjecting the color pigment to an oxidation using sodium hypochlorite, a method for sulfonating the color pigment and a method for reacting the color pigment with a diazonium salt.

Wetting Agent

The wetting agent is not restricted and may be properly selected depending on the application. Examples of the wetting agent include the same wetting agents as those used for the dye ink.

The amount of the wetting agent in the pigment ink is preferably 5% by mass to 50% by mass, more preferably 8% by mass to 30% by mass, based on the mass of the pigment ink.

$C_8$ to $C_{11}$ Polyol Compound or Glycol Ether Compound

Examples of the $C_8$ to $C_{11}$ polyol compound or glycol ether compound include the same $C_8$ to $C_{11}$ polyol compound or glycol ether compound as those used for the dye ink.

Surfactant

The surfactant is not restricted and may be properly selected depending on the application. Examples of the surfactant include an amphoteric surfactant, an anionic surfactant, a cationic surfactant and a nonionic surfactant. These surfactants may be used individually or in combination.

Examples of the amphoteric surfactant include alanine, dodecil di(aminoethyl) glycine, di(octylaminoethyl) glycine and N-alkyl-N,N-dimethyl ammonium betaine.

Examples of the anionic surfactant include a polyoxyethylene alkyl ether acetate salt, a dodecylbenzene sulfonate salt, a laurylate salt and a polyoxyethylene alkyl ether sulfonate salt.

Examples of the nonionic surfactant include a polyoxyethylene alkyl ether, a polyoxyethylene alkyl ester, a polyoxyethylene sorbitan fatty acid ester, a polyoxyethylene alkyl phenyl ether, a polyoxyethylene alkyl amine and a polyethylene alkyl amide. Examples of the acetylene glycol surfactant include a 2,4,7,9-tetramethyl-5-decine-4,7-diol, 3,6-dimethyl-4-octine-3,6-diol and 3,5-dimethyl-1-hexine-3-ol (commercially available examples of the acetylene glycol surfactant include Surfynol 104, 82, 465, 485 and TG (manufactured and sold by Air Products and Chemicals, Inc., U.S.A.)). Particularly, when Surfynol 465, 104 or TG is used for producing the pigment ink, the pigment ink exhibits an advantageous printing quality.

Examples of the cationic surfactant include an amine salt surfactant, such as an alkyl amine salt, an amino alcohol fatty acid derivative, a polyamine fatty acid derivative and an imidazoline; and a quaternary ammonium salt surfactant, such as an alkyltrimethyl ammonium salt., a dialkyldimethyl ammonium salt, an alkyldimethylbenzyl ammonium salt, a pyrridinium salt, an alkylisoquinolinium salt and benzethonium chloride.

Examples of the surfactant include also a surfactant containing fluorine. The surfactant containing fluorine is not restricted and may be properly selected depending on the application. Preferred examples of the surfactant containing fluorine include an anionic surfactant containing a fluoalkyl group and a cationic surfactant containing a fluoroalkyl group.

The pigment ink may comprise an anti-forming agent and examples of the anti-forming agent include the same anti-forming agent as that used for the dye ink.

Other Components

The above-noted other components are not restricted and may be properly selected depending on the necessity. Examples of the other components include an antiseptic and anti-fungus agent, a pH controlling agent, an anticorrosion agent, an antioxidant, an ultraviolet-absorbing agent, an oxygen-absorbing agent and a light stabilizer.

Examples of the antiseptic or anti-fungus agent include sodium dehydroacetate, sodium sorbate, 2-pyridinethiol-1-oxide sodium, sodium benzoate, pentachlorophenol sodium and 1,2-benzisothiazoline-3-on. Among them, 1,2-benzisothiazoline-3-on is particularly preferred.

The pH controlling agent is not restricted so long as the agent can control the pH of the ink to 7 or more without adversely affecting the produced ink and may be properly selected depending on the application.

Examples of the pH controlling agent include an amine, such as diethanolamine and triethanolamine; a hydroxide of an alkali metal, such as lithium hydroxide, sodium hydroxide and potassium hydroxide; a hydroxide, such as ammonium hydroxide, quaternary ammonium hydroxide and quaternary phosphonium hydroxide; and a carbonate of an alkali metal, such as lithium carbonate, sodium carbonate and potassium carbonate. Among them, 2-amino-2-ethyl-1,3-propanediol is preferably used. This pH controlling agent is water-soluble and can be uniformly dissolved in an aqueous ink, so that this pH controlling agent does not affect adversely a colorant dispersed or dissolved in the aqueous ink. Further, this pH controlling agent has not only the function as a pH controlling agent, but also an extremely high effect for preventing the dissolution of the material for the inkjet head, when at least a part of the liquid space, fluid-resistance part, vibrating plate and nozzle member of the inkjet head is formed using a material comprising silicone or nickel, so that the extremely high effect for preventing the dissolution of the material for the inkjet head leads to a remarkable effect for the long-period reliability of the inkjet recording apparatus using an ink comprising this pH controlling agent (2-amino-2-ethyl-1,3-propanediol). Further, it was also clarified that this pH controlling agent has an extremely high effect for improving the delivery stability of the ink.

Examples of the anticorrosion agent include an acidic sulfite salt, sodium thiosulfate, ammonium thiodiglycolate, diisopropyl ammonium nitrite, pentaerythritol tetranitrate and dicyclohexylammonium nitrite.

Examples of the antioxidant agent include a phenol antioxidant (e.g., a hindered phenol antioxidant), an amine antioxidant, a sulfur-containing antioxidant and a phosphor-containing antioxidant.

Examples of the phenol antioxidant (including a hindered phenol antioxidant) include butylated hydroxyanisole, 2,6-di-tert-butyl-4-ethylphenol, stearyl-β-(3,5-di-tert-butyl-4-hydroxyphenyl) propionate, 2,2'-methylenebis (4-ethyl-6-tert-butylphenol), 2,2'-methylenebis (4-methyl-6-tert-butylphenol), 4,4'-butylidenebis (3-methyl-6-tert-butylphenol), 3,9-bis[2-[3-(3-t-butyl-4-hydroxy-5-methylphenyl)-propyonyloxy]-1,1-dimethylethyl]-2,4,8,10-tetraoxyspiro[5.5]undecane, 1,1,3-tris (2-methyl-4-hydroxy-5-tert-butylphenyl)butane, 1,3,5-trimethyl-2,4,6-tris (3,5-di-tert-butyl-4-hydroxybenzyl)benzene and tetrakis[methylene-3-(3',5'-di-tert-butyl-4'-hydroxyphenyl)propionate]methane.

Examples of the amine antioxidant include phenyl-β-naphthylamine, α-naphthylamine, N,N'-di-sec-butyl-p-phenylenediamine, phenothiazine, N,N'-diphenyl-p-phenylenediamine, 2,6-di-tert-butyl-p-cresol, 2,6-di-tert-butylphenol, 2,4-dimethyl-6-tert-butylphenol, butylhydroxyanisole, 2,2'-methylenebis(4-methyl-6-tert-butylphenol), 4,4'-butylidenebis(3-methyl-6-tert-butylphenol), tetraxis[methylene-3 (3,5-di-tert-butyl-4-dihydroxyphenyl)propionate]methane and 1,1,3-tris(2-methyl-4-hydroxy-5-tert-butylphenyl)butane.

Examples of the sulfur-containing antioxidant include dilauryl-3,3'-thiodipropionate, distearyl-thiodipropionate, lauryl-stearyl-thiodipropionate, dimyristyl-3,3'-thiodipropionate, distearyl-β,β'-thiodipropionate, 2-mercapto-benzoimidazole and dilaurylsulfide.

Examples of the phosphor-containing antioxidant include triphenyl phosphate, octadecyl phosphate, triisodecyl phophite, trilauryl-trithio phosphate and trinonylphenyl phosphate.

Examples of the ultraviolet absorber include a benzophenone ultraviolet absorber, a benzotriazole ultraviolet absorber, a salicylate ultraviolet absorber, a cyanoacrylate ultraviolet absorber and a nickel complex salt ultraviolet absorber.

Examples of the benzophenone ultraviolet absorber include 2-hydroxy-4-n-octoxybenzophenone, 2-hydroxy-4-n-dodecyloxybenzophenone, 2-hydroxy-4-dihydroxybenzophenone, 2-hydroxy-4-methoxybenzophenone and 2,2',4,4'-tetrahydroxybenzophenone.

Examples of the benzotriazole ultraviolet absorber include 2-(2'-hydroxy-5'-tert-octylphenyl)benzotriazole, 2-(2'-hydroxy-5'-tert-methylphenyl)benzotriazole, 2-(2'-hydroxy-4'-octoxyphenyl)benzotriazole and 2-(2'-hydroxy-3'-tert-butyl-5'-methylphenyl-5-chloro-benzotriazole.

Examples of the salicylate ultraviolet absorber include phenyl salicylate, p-tert-butylphenyl salicylate and p-octylphenyl salicylate.

Examples of the cyanoacrylate ultraviolet absorber include ethyl-2-cyano-3,3'-diphenyl acrylate, methyl-2-cyano-3-methyl-3-(p-methoxyphenyl)acrylate and butyl-2-cyano-3-methyl-3-(p-methoxyphenyl)acrylate.

Examples of the nickel complex salt ultraviolet absorber include nickelbis (octylphenyl) sulfide, 2,2'-thiobis (4-tert-octylphenolate)-n-butylamine nickel (II), 2,2'-thiobis (4-tert-octylphelate)-n-ethyihexylamine nickel (II) and 2,2'-thiobis (4-tert-octylphelate)-triethanolamine nickel (II).

As pH of the recording ink according to the present invention, the pigment ink has pH of preferably 8 to 11. When the pH of the pigment ink is less than 8, the dispersion of the pigment ink is sometimes destabilized. On the other hand, when pH of the pigment ink is more than 11, the liquid contacting properties of the pigment ink is sometimes impaired. The dye ink has pH of preferably 7 to 11. When the pH of the dye ink is less than 7, the dispersion of the pigment ink is sometimes destabilized during the mixing of the dye ink with the pigment ink. On the other hand, when pH of the dye ink is more than 11, the liquid contacting properties of the dye ink is sometimes impaired.

The color of the recording ink according to the present invention is not restricted and may be properly selected depending on the application. Examples of the color of the ink include yellow, cyan, magenta and black. When an ink set containing two or more of these inks are used, an image in multi-color can be formed and when an ink set containing all of these, inks is used, an image in full-color can be formed.

The recording ink according to the present invention can be advantageously used in any one of inkjet heads of such types as a piezo type in which using a piezoelectricity element as a pressure generating unit applying the pressure to the ink in the ink path, a vibrating plate forming the wall of the ink path is deformed and the volume of the ink path is changed, so that the ink drop is delivered (see JP-A No. 02-51734); a thermal type in which using a heating element having a high electrical resistance, the ink is heated in the ink path and a bubble is generated (JP-A No. 61-59911); and a static charge type in which by the static power generated between a vibrating plate and an electrode, a vibrating plate is deformed and the volume of the ink path is changed, so that the ink drop is delivered (see JP-A No. 06-71882).

The recording ink according to the first and second aspects of the present invention can be preferably used in various fields as follows. The recording ink can be so preferably used in an image forming apparatus (e.g., a printer) of an inkjet recording system that by heating the recording ink together with a paper for the recording at 50° C. to 200° C. during, before or after the printing, the recording ink can be used for a printer of an apparatus having the function of promoting the printing fixation. The recording ink can be particularly preferably used for the following ink cartridge, ink record, inkjet recording apparatus and inkjet recording process according to the present invention.

(Ink cartridge)

The ink cartridge according to the first and second aspects of the present invention comprises the recording ink according to the first and second aspects of the present invention which is encapsulated in a container and optionally other members selected properly.

The container is not restricted and the form, structure, size and material thereof may be properly selected depending on the application. Preferred examples of the container include a container having at least an ink bag produced using an aluminum laminated film or a resin film.

The capacity of the ink cartridge is preferably 15 g or more of an ink. When the encapsulated amount of the ink is less than 15 g, in the case of the inkjet recording apparatus according to the present invention by which the printing is performed in a large amount of sheets of the paper, the frequency of changing the cartridge becomes high, so that the object and effect of the present invention cannot be obtained sometimes. Further, according to the inkjet recording apparatus according to the present invention, even when an ink tank having such a large capacity is used, the recording apparatus is improved for preventing the poor liquid contacting properties of the ink due to the preservation of the ink and the forming due to the air leak caused by the above-noted poor liquid contacting properties of the ink.

Figure 4:
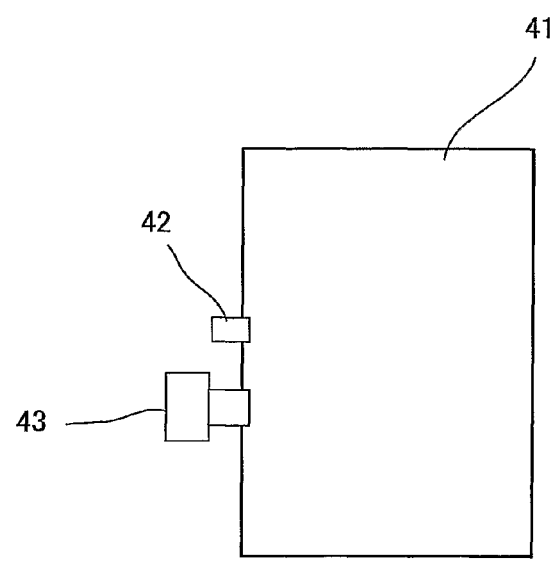
FIG. 4 is a view schematically showing an example of the ink cartridge according to the present invention.
Figure 5:
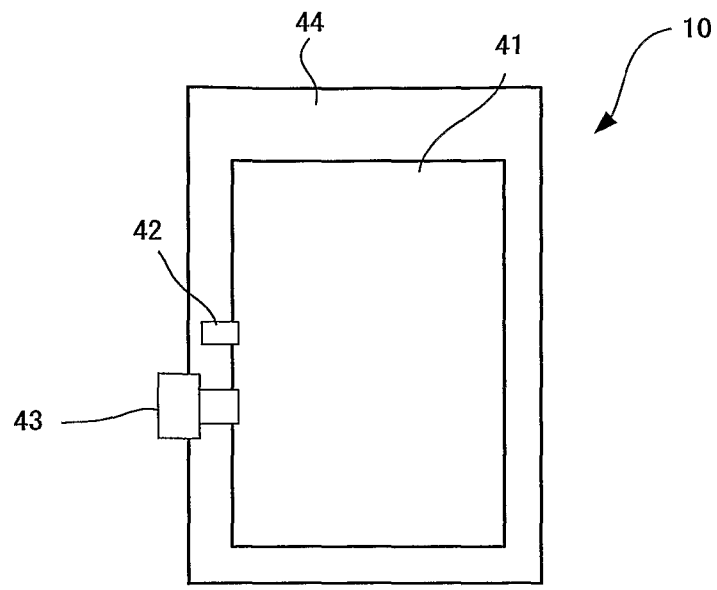
FIG. 5 is a view schematically showing an example of the ink cartridge in FIG. 4 contained in a casing according to the present invention.

Next, with respect to the ink cartridge, explanations are given referring to FIGS. 4 and 5. FIG. 4 is a view schematically showing an example of the ink cartridge according to the present invention and FIG. 5 is a view schematically showing an example of the ink cartridge in FIG. 4 contained in a casing according to the present invention.

The ink cartridge 10, as shown in FIG. 4, is loaded into the ink bag 41 from the ink inlet 42 which is sealed by fusion after evacuating the ink bag 41. During the use, the ink is fed to the recording apparatus by piercing the ink outlet 43 made of a rubber with a needle attached to the recording apparatus.

The ink bag 41 is made of a packing material, such as an aluminum laminated-film having no gas-permeability. The ink bag 41 is usually, as shown in FIG. 5, encapsulated in the cartridge case 44 and is fitted in various inkjet recording apparatuses in an attachable and detachable manner for the using.

Inkjet Recording Apparatus and Inkjet Recording Process

The inkjet recording apparatus according to the present invention comprises at least an ink ejecting unit and other units selected properly depending on the necessity, such as a stimulation generating unit and a controlling unit.

The inkjet recording process according to the present invention comprises at least ejecting the ink and other steps selected properly depending on the necessity, such as the stimulation-generating and the controlling.

The inkjet recording process according to the present invention can be preferably performed by the inkjet recording apparatus according the present invention and the ink ejecting can be preferably performed by the ink ejecting unit. Further, the other steps can be preferably performed by the other units.

Ejecting Ink and Ink Ejecting Unit

The ink ejecting is the image-forming by applying a stimulation to the recording ink according to the first aspect of the present invention and by ejecting the recording ink and it is preferred that the image-forming is performed using the dye ink and the pigment ink properly alternately through one inkjet head.

The ink ejecting unit is the image-forming unit by applying a stimulation to the recording ink according to the first aspect of the present invention and by ejecting the recording ink and it is preferred that the image-forming is performed using the dye ink and the pigment ink properly alternately through one inkjet head.

The ink ejecting unit is not restricted and may be selected depending on the application. Examples of the ink ejecting unit include various ink delivery heads. Among them, particularly an ink ejecting unit comprising an inkjet head (ink delivery head) having plural trains of nozzles and a sub tank holding a liquid fed from a tank for storing a liquid and feeding a liquid to the liquid drop delivering head, is preferred.

The sub tank comprises preferably a negative-pressure generating unit by which a negative pressure is generated in the sub tank, an opening unit to the atmosphere by which the inside of the sub tank is opened to the atmosphere and a detecting unit of the ink by which the presence of the ink is detected through the difference of the electrical resistance.

The stimulation can be generated, for example by the stimulation generating unit. The stimulation is not restricted and may be properly selected depending on the application. Examples of the stimulation include a heat (temperature), a pressure, a vibration and a light. These stimulations may be used individually or in combination. Among them, the heat and the pressure are preferred.

Examples of the stimulation generating unit include a heating apparatus, a pressurizing apparatus, a piezoelectricity element, a vibration generating apparatus, an ultrasonic oscillating machine and a light. Specific examples of the stimulation generating unit include a piezoelectricity actuator, such as a piezoelectricity element, a thermal actuator utilizing the phase change caused by the film boiling of the liquid which is generated using an electricity-heat exchange element, such as a heating element having a high electrical resistance, an actuator of a shape memory alloy utilizing the phase change of a metal due to the change of the temperature and a static actuator utilizing the static power.

The aspect of ejecting the recording ink is not restricted and varies depending on the type of the stimulation as follows. For example, when the stimulation is "heat", the aspect is a method in which by applying a thermal energy corresponding to a recording signal to the recording ink in the recording head using, for example a thermal head, a bubble is generated in the recording ink by the applied thermal energy and by the pressure of the generated bubble, the recording ink is delivered and injected as a liquid drop through a nozzle pore of the recording head. When the stimulation is a pressure, an aspect is a method in which by applying a voltage to a piezoelectricity element installed at the so-called pressure space in the ink path of the recording head, the piezoelectricity element is made flex and the volume of the pressure space is decreased, so that the recording ink is delivered and injected as a liquid drop through a nozzle pore of the recording head.

The inkjet recording apparatus according to the present invention comprises preferably also a scraping unit by which an adhered ink is scraped off into the receiver for the blanc-delivery. Examples of the scraping unit include a wiper and a cutter.

The controlling unit is not restricted so long as the unit can control the action of the above-noted units and may be properly selected depending on the application. Examples of the controlling unit include a sequencer and a computer.

With respect to an aspect for embodying the inkjet recording process according to the present invention using the inkjet recording apparatus according to the present invention, with referring to FIGS., explanations are given. The inkjet recording apparatus shown in FIG. 6 comprises the main body 1, the paper feeding tray 2 attached to the main body 1, the paper discharging tray 3 attached to the main body 1 in which the paper on which the image is recorded is stocked and the ink cartridge loading part 6. On the upper surface of the ink cartridge loading part 6, the operation part 7 comprising an operation key and a display instrument is disposed. The ink cartridge loading part 6 has the front cover 8 which can be opened and shut for attaching and detaching the ink cartridge 10.

Figure 7:
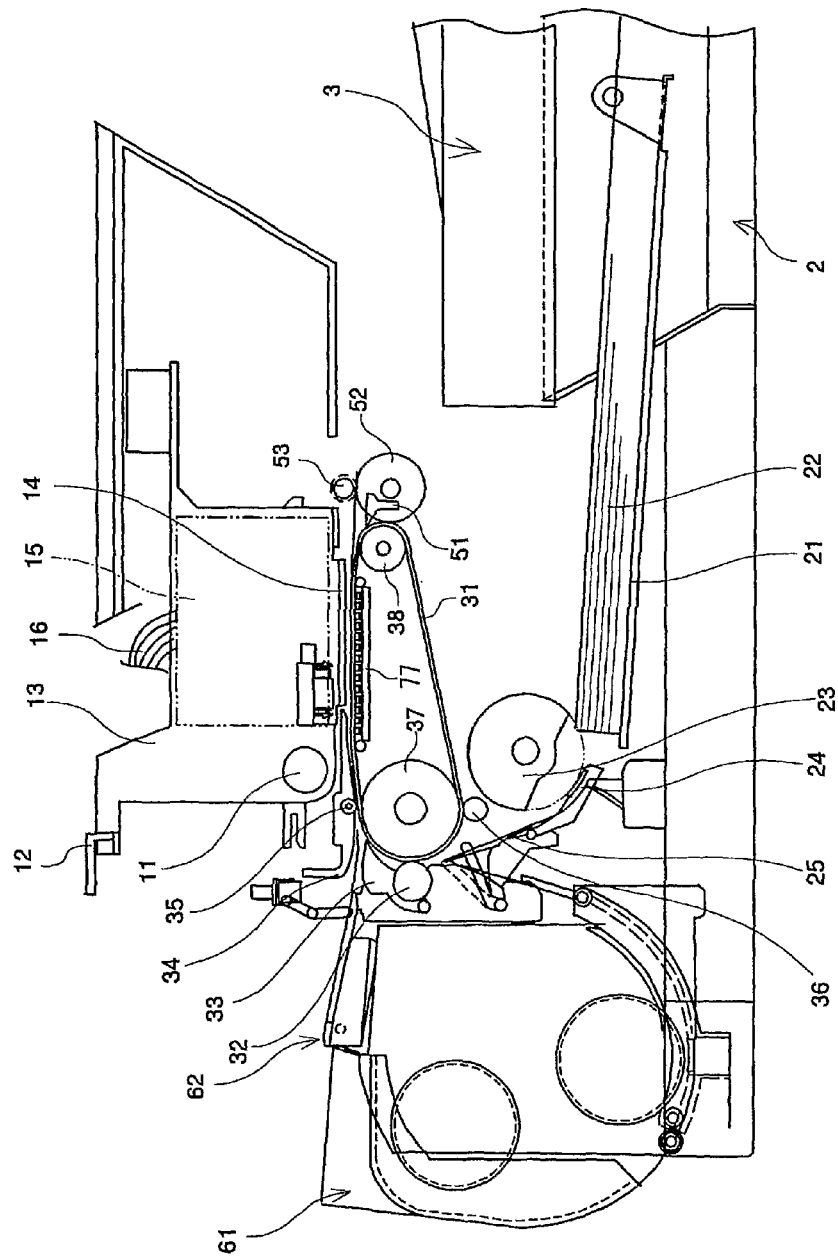
FIG. 7 is an explanatory view schematically showing an example of the inner structure of the inkjet recording apparatus shown in FIG. 6.
Figure 8:
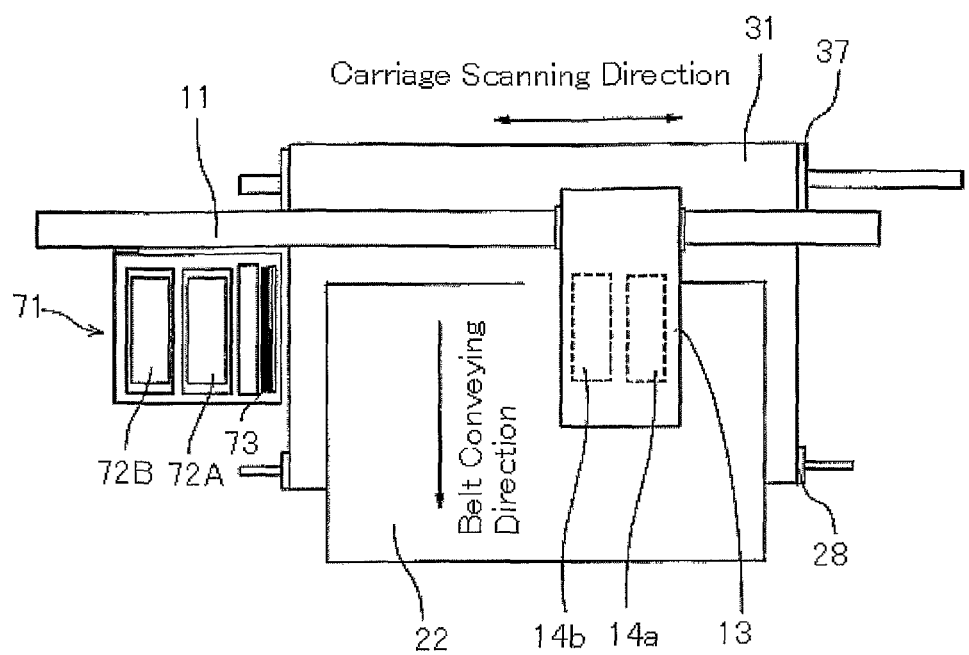
FIG. 8 is an expanded view schematically showing an example of the inkjet head according to the present invention.

In the main body 1, as shown in FIG. 7 and FIG. 8, the carriage 13 is supported by the guide rod 11 and the stay 12 which are laid across the right and left side walls (not illustrated in FIGS.) of the main body in such a manner that the carriage 13 can be scanned flexibly in the main scanning direction and the carriage 13 is moved and scanned by a main scanning motor (not illustrated in FIGS.) in the direction indicated by the arrow in FIG. 8.

To the carriage 13, the recording head 14 comprising four heads for the inkjet recording which deliver respectively the recording ink drop of yellow (Y), cyan (C), magenta (M) and black (B) is fitted in such a manner that plural ink delivery outlets are oriented in the direction crossing the main scanning direction and the direction of the ink-drop delivery is downwards.

As an inkjet recording head consisting the recording head 14, a piezoelectricity actuator, such as a piezoelectricity element, a thermal actuator utilizing the phase change caused by the film boiling of the liquid which is generated using a electricity-heat exchange element, such as a heating element having a high electrical resistance, an actuator of a shape memory alloy utilizing the phase change of a metal due to the change of the temperature and a head equipped with a static actuator utilizing the static power as an energy generating unit for delivering the recording ink, can be used.

The carriage 13 is also equipped with the sub tank 15 of each color for feeding the ink of each color to the recording head 14. Into the sub tank 15, the recording ink according to the present invention is fed and supplemented from the ink cartridge 10 according to the present invention which is loaded in the ink cartridge loading part 6 through a feeding tube (not illustrated in FIGs.).

On the other hand, the paper feeding part for feeding the paper 22 which is piled up on the paper loading part 21 (pressure plate) in the paper feeding tray 2 comprises the semicircular roller (the paper feeding roller 23) feeding the paper 22 one by one separately from the paper loading part 21 and the separating pad 24 made of a material having a large friction coefficient, wherein the separating pad 24 is biased to the paper feeding roller 23.

The paper conveying part for conveying the paper 22 fed from the paper feeding part in the part beneath the recording head 14 comprises the conveying belt 31 for conveying the paper 22 by adsorbing the paper 22 statically, the counter roller 32 for conveying the paper 22 conveyed from the paper feeding part through the guide 25 by holding the paper 22 between the conveying belt 31 and the counter roller 32, the conveying guide 33 for changing the conveying direction of the paper 22 which is conveyed perpendicular upwards by 90° to convey the paper 22 onto the conveying belt 31, the pressing member 34, the top-pressurizing roller 35 biased to the conveying belt 31 by the pressing member 34 and the charging roller 36 which is a charging unit for charging the surface of the conveying belt 31.

The conveying belt 31 is an endless belt, is hung between the conveying roller 37 and the tension roller 38 and can be rotated in the direction of conveying the paper 22. On the reverse surface of the conveying belt 31, the guide member 77 is disposed corresponding to the printing area by the recording head 14. The paper discharging part for discharging the paper 22 recorded by the recording head 14 comprises the peeling nail 51 for peeling the paper 22 from the conveying belt 31, the paper discharging roller 52 and the paper discharging roller 53, wherein the paper discharging tray 3 is disposed under the paper discharging roller 52.

In the rear part of the main body 1, the both-surface paper feeding unit 61 is fitted in an attachable and detachable manner. The both-surface paper feeding unit 61 receives the paper 22 which is back-conveyed by the reverse rotating of the conveying belt 31 and reverses the conveying direction of the paper 22, thereby feeding the paper 22 between the counter roller 32 and the conveying belt 31. Above the both-surface paper feeding unit 61, the manual paper feeding part 62 is installed.

In the inkjet recording apparatus, the paper 22 is fed one by one separately and upwards perpendicularly from the paper feeding part and conveyed between the conveying roller 31 and the counter roller 32 according to the guidance of the guide 25. Further, the top of the paper 22 is guided by the conveying guide 33, is pressed to the conveying belt 31 by the top-pressurizing roller 35 and the conveying direction of the paper 22 is changed by 90° C.

At this time, the paper 22 is adsorbed statically to the conveying belt 31 charged by the charging roller 36 and conveyed. Here, by driving the recording head 14 according to the image signal with moving the carriage 13, the stopped paper 22 is recorded in an amount of one line with the delivered ink drop and after the paper 22 is conveyed in a specified amount, the paper 22 is recorded from the next line. By receiving the signal for the recording completion or the signal for the reaching of the bottom of the paper 22 at the recording region, the recording action is stopped and the paper 22 is discharged into the discharging tray 3.

When the signal indicating that a remaining amount of the recording ink in the sub tank 15 is almost 0 is detected, a required amount of the recording ink is supplemented from the ink cartridge 1 into the sub tank 15.

Here, explanations are given with respect to an example of the present invention applied to an serial (shuttle) inkjet recording apparatus in which the carriage is scanned. However, the present invention can be also applied to a line inkjet recording apparatus equipped with a head in the form of a line.

Figure 9:
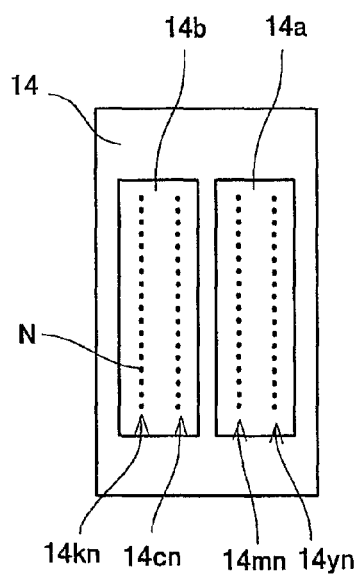
FIG. 9 is a view schematically showing an example of the train of nozzles for the inkjet head according to the present invention.

The recording head 14 (the general term for plural heads) consists of, as shown in FIG. 9, the liquid drop delivery head 14a comprising the train of nozzles 14yn which comprises many nozzles N delivering an ink drop of yellow (Y) and the train of nozzles 14mn which comprises many nozzles N delivering an ink drop of magenta (M); and the liquid drop delivery head 14b comprising the train of 10 nozzles 14cn which comprises many nozzles N delivering an ink drop of cyan (C) and the train of nozzles 14kn which comprises many nozzles N delivering an ink drop of black (Bk).

In the recording head 14 shown in FIG. 9, inks of the two colors among (Y), (M), (C) and (Bk) are fed to one head from the two individual sub tanks and inks of the other two colors among (Y), (M), (C) and (Bk) are fed to another head from the other two individual sub tanks (i.e., the recording head is equipped with two heads and four sub tanks) for the printing using inks of four colors; however, the printing may be performed also in such a manner that inks of the four colors are fed respectively to four individual heads having two trains of nozzles from four individual sub tanks (i.e., the recording head is equipped with four heads and four sub tanks) for the printing using inks of four colors. In the following Examples, an inkjet printer (manufactured and sold by Ricoh Company, Ltd.; trade name: IPSiO G707) having four heads which have two trains of nozzles was used.

As an inkjet recording head consisting the recording head 14, a piezoelectricity actuator, such as a piezoelectricity element, a thermal actuator utilizing the phase change caused by the film boiling of the liquid which is generated using a electricity-heat exchange element, such as a heating element having a high electrical resistance, an actuator of a shape memory alloy utilizing the phase change of a metal due to the change of the temperature and a head equipped with a static actuator utilizing the static power as an energy generating unit for delivering the recording ink, can be used. In the following Examples, a head equipped with a piezo electricity actuator (piezo electricity element) as an energy generating unit was used.

The carriage 13 is equipped with four sub tanks 15 (more specifically 15y, 15m, 15c and 15k) as four liquid containers for feeding inks of four colors respectively to nozzles 14yn, 14mn, 14cn and 14kn. To the four sub tanks 15, the inks of four colors are respectively fed and supplemented from four main tanks (ink cartridges) 10 (more specifically 10y, 10m, 10c and 10k) through four ink feeding tubes 16. The four main tanks 10 hold respectively inks of four colors, such as yellow (Y), cyan (C), magenta (M) and black (Bk); however, the main tank 10k for holding the ink of black (Bk) has a larger holding capacity than those of the main tanks 10y, 10m and 10c.

Figure 10:
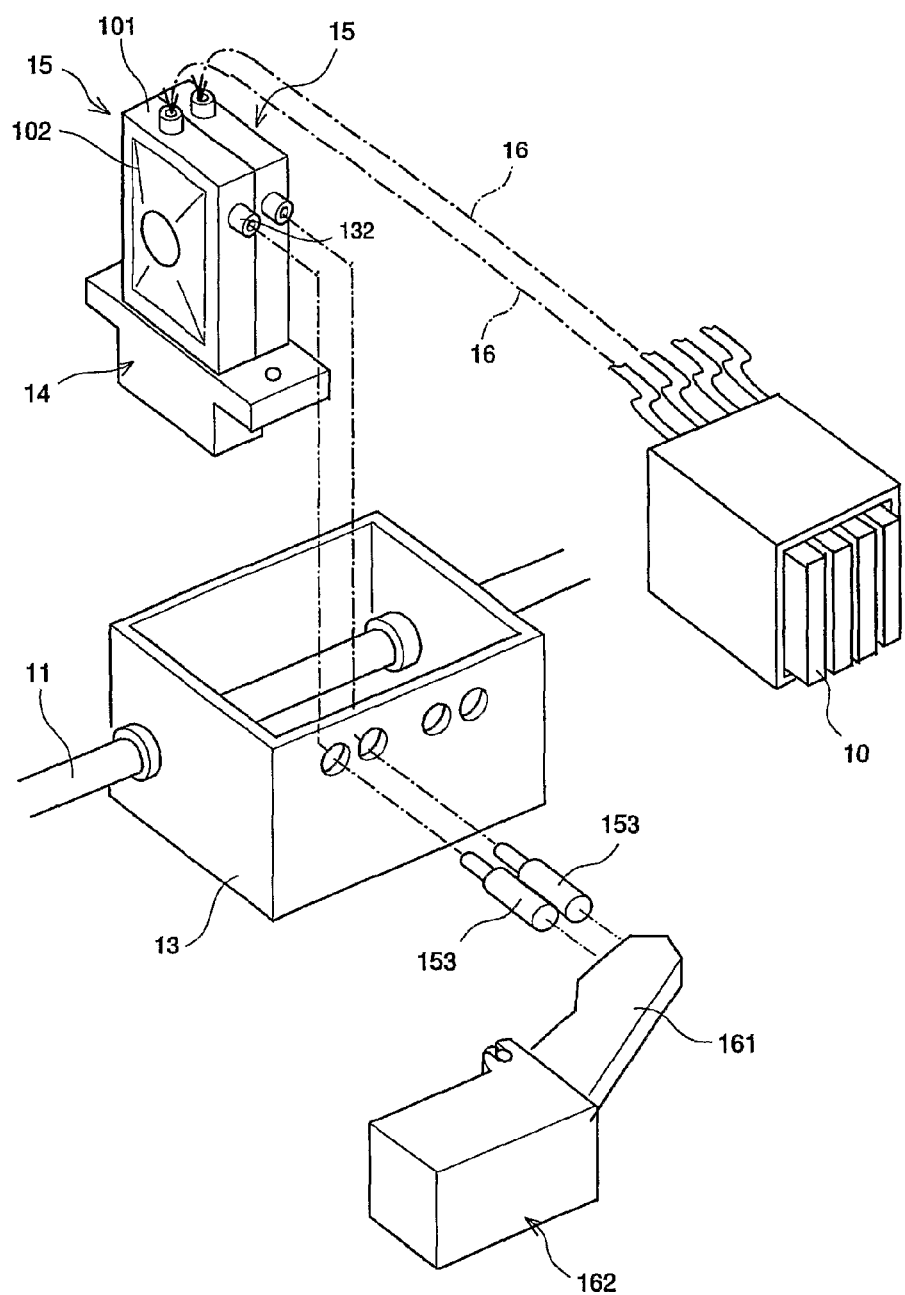
FIG. 10 is an exploded perspective explanatory view schematically showing an example of the liquid feeding unit in the inkjet recording apparatus according to the present invention.
Figure 11:
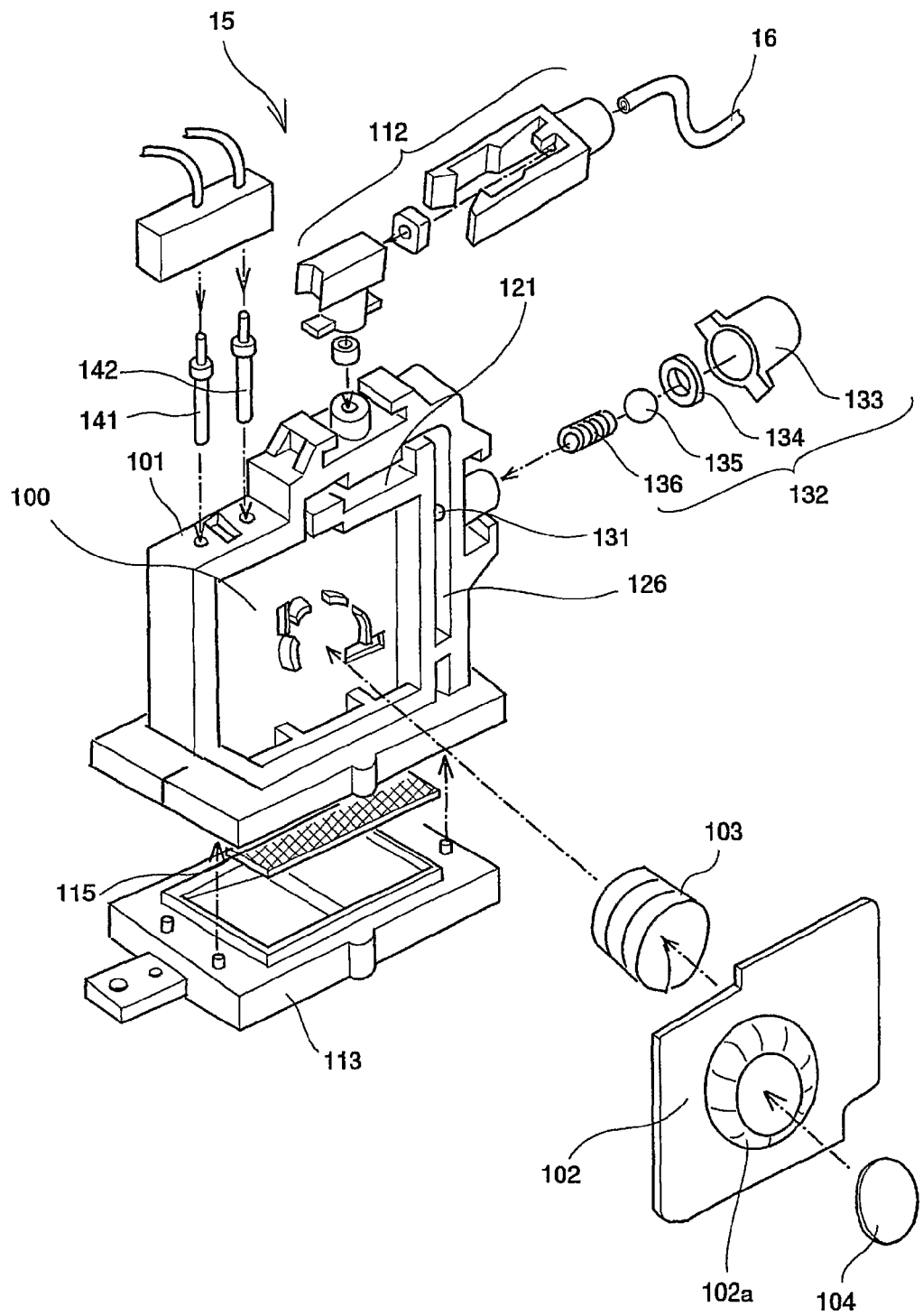
FIG. 11 is an expanded view of FIG. 10.
Figure 12:
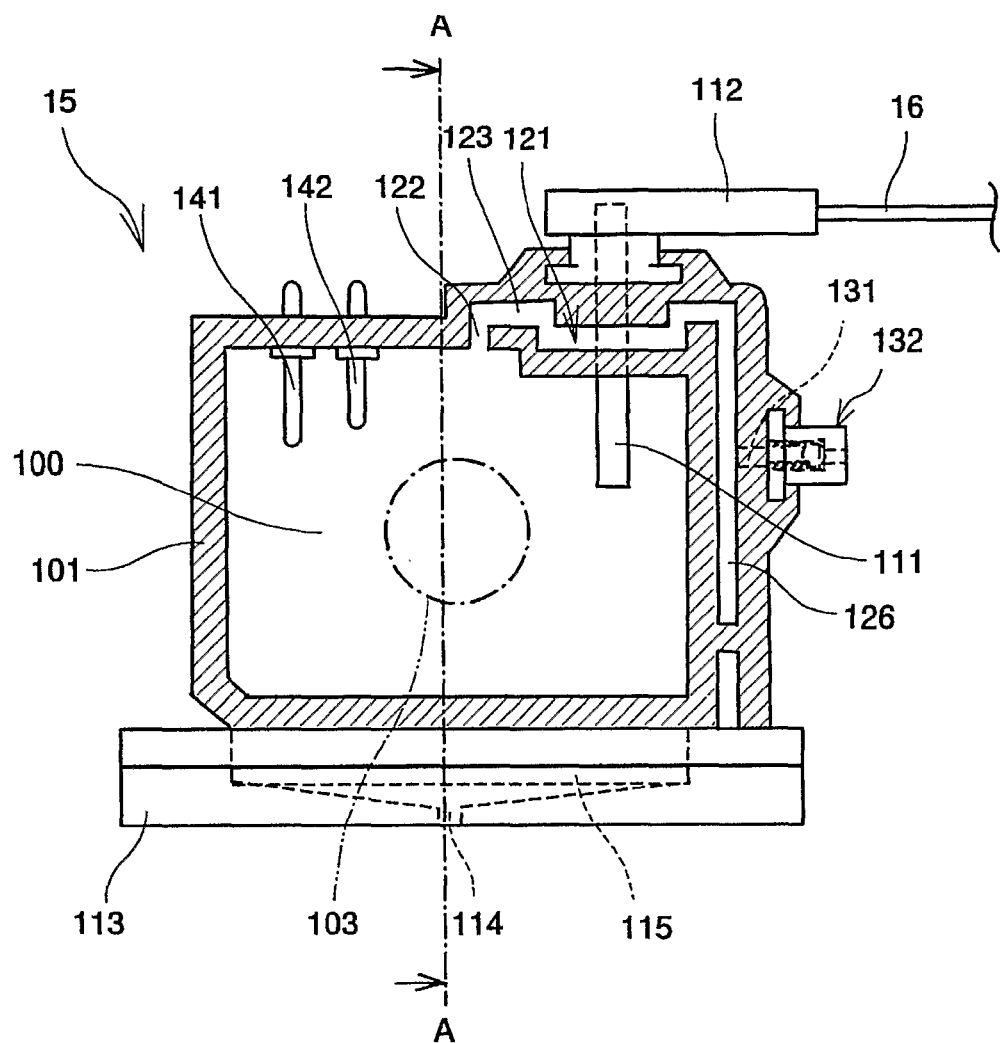
FIG. 12 is an explanatory side view schematically showing an example of the sub tank.

Next, with respect to an ink feeding apparatus as a liquid feeding apparatus of the recording apparatus, referring to FIGS. 10 and 12, explanations are given in detail. FIG. 10 is an exploded perspective explanatory view schematically showing an example of the ink feeding apparatus, FIG. 11 is a detail view of FIG. 10 and FIG. 12 is an explanatory side view schematically showing an example of the sub tank.

The ink feeding apparatus consists of, as noted above, the sub tank 15 which is a liquid container feeding the ink to the recording heads 14a and 14b and which is equipped with the carriage 13 and the main tank (ink cartridge) 10 which feeds and supplements the ink to the sub tank through the feeding tube 16.

One sub tank comprises the container main body (case main body) 101 forming the ink holding part 100 which holds the ink, the film member (flexible film member) 102 which is adhesive-bonded to the container main body 101 through adhesive-bonding or solvent-welding for sealing the opening of the ink holding part 100 (located in one surface of the sub tank 15) and the spring 103 which is a flexible member located between the case main body 101 and the film member 102 in the inside of the ink holding part 100 for biasing the film member 102 to the outside of the ink holding part 100.

Figure 13:
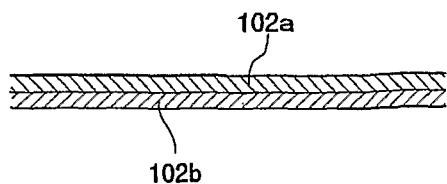
FIGS. 13A and B are longitudinal sectional views at the A-A line shown in FIG. 12.
Figure 13:
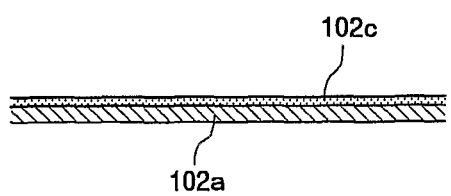

Here, the film member 102 may be produced in a single-ply structure or, as shown in FIG. 13A, in two layers structure produced by laminating the first layer 102a and the second layer 102b which are different from each other in the type, for example by laminating a polyethylene film 10 member and a nylon film member, or, as shown in FIG. 13B, in two layers structure produced by laminating the first layer 102a and the silica-metallizing layer 102c. By producing the film member 102 in the above-noted structure, the liquid resistance against the ink of the film member 102 can be reliably secured. Also, by producing the film member 102 comprising the silica-metallizing layer, the liquid resistance against the ink of the film member 102 can be improved.

The film member 102 has a thickness of preferably 10 μm to 100 μm. When the thickness is less than 10 μm, a breakage due to the aging deterioration is easily caused sometimes. On the other hand, when the thickness is more than 100 μm, the flexibility of the film member 102 is lowered, so that the effective generation of the negative pressure in the film member 102 becomes difficult sometimes.

Further, on the surface of the film member 102, the inflating part 102a which is inflated to a convex form corresponding to the action of the spring 103 and the outer surface thereof, the reinforcing member 104 is adhesive-bonded. Thus, by forming a convex part in the flexible film member 102, the flexible member (here, the spring) 103 can be stably maintained. In this case, by producing the film member 102 through shaping a film member in the form of a sheet into a convex form, the convex part of the film member 102 can be easily formed.

In the case 101, the ink introducing path 111 for supplementing the ink to the ink holding part 100 is formed and the connecting part 112 for connecting the ink introducing path 111 and the feeding tube 16 which is connected with the ink cartridge 10, is fitted in an attachable and detachable manner. Between the ink cartridge 10 and the sub tank 15, the below-noted liquid feeding pump for pressure-feeding the ink from the ink cartridge 10 to the sub tank 15 is installed.

Further, under the case 101, the connecting member 113 for feeding the ink from the ink holding part 100 to the recording head 14 is attached. In the connecting member 113, the ink feeding path 114 is formed and between the ink feeding path 114 and the ink holding part 100, the filter 115 is fitted.

In the upper part of the case 101, the airflow path 121 for purging air from the ink holding part 100 is formed. The airflow path 121 comprises the inlet flow path 122 which is opened to the ink holding part 100 and the successive flow path 123 (referred to as "orthogonal flow path") and the successive flow path 123 is connected communicative with the opening to the atmosphere 131 formed in the case 101 and with the accumulating part 126 which is located below the opening to the atmosphere 131.

To the opening to the atmosphere 131, the valve for opening to the atmosphere 132 which alternates the closed state and opened-to the atmosphere state of the sub tank 15, is attached. The valve for opening to the atmosphere 132 consists of the holder 133 and the valve seat 134, the ball 135 as the valve body and the valve spring 136 biasing the ball 135 to the valve seat 134 which are housed in the holder 133.

Herein below, with respect to the function of the accumulating part 126, explanations are given. When the main body of the apparatus is inclined or vibrated, the ink invades into the air flow path 121 with a high provability. Then, according to the function by which the ink invading through the air flow path 121 can be accumulated in the accumulating part 126, even when the sub tank is dropped during the transportation thereof and the ink invades into the air flow path 121, the operation trouble of the valve for opening to the atmosphere 132 due to the solidification of the ink in the opening to the atmosphere 131 and the valve for opening to the atmosphere 132 which opens and shuts the opening to the atmosphere 131 can be prevented.

In the upper part of the case 101, two detecting electrodes 141 and 142 for detecting the state in which the amount of the ink in the sub tank 15 becomes the specified amount or less (the state is referred to as "no ink") are fitted. By detecting the change of the continuity state between the detecting electrodes 141 and 142, which is caused by the state change from the state in which both the detecting electrodes 141 and 142 are immersed in the ink to the state in which any one of the detecting electrodes 141 and 142 is not immersed in the ink, the state "no ink" can be detected.

As shown in FIGS. 14 and 15, in the no-printing region of one side (or the both sides) of the scanning direction of the carriage 13, the maintaining and recovering system 71 (hereinbelow referred to as "sub system") for maintaining and recovering the state of the nozzle of the recording head 14 is arranged. FIG. 14 is a view schematically showing the view of the maintaining and recovering system 71 from a point over the maintaining and recovering system 71 and FIG. 15 is an explanatory view schematically showing the maintaining unit. The sub system 71 comprises the cap members 72A and 72B for capping the nozzle surfaces of the recording heads 14a and 14b and the wiper blade 73 for wiping the above-noted nozzle surfaces. Between the cap member 72A and the wiper blade 73, the receiver for the blanc-delivery is arranged. In the receiver for the blanc-delivery, the ink is delivered and the delivered ink flows to the waste liquid tank located under the receiver. Since at the part to which the ink is delivered, the ink is easily solidified, the wiper for scraping off the solidified ink is fitted. Particularly when the dye ink having a high viscosity is used, the wiper is effective for scraping off the solidified dye ink in the receiver for the blanc-delivery.

For the case where the solidified dye is accumulated, it is also effective that a scraping unit having a cutter is installed. Both the scraping unit having a wiper and scraping unit having a cutter for the pigment ink which are installed in the inkjet printer (manufactured and sold by Ricoh Company Ltd.: trade name: IPSiO G707 or G 505) were effective also for the dye ink. As mentioned above, particularly in the case where the dye ink having a limited solubility is used, the accumulated adhered deposit could be hardly destroyed conventionally. When the dye ink and the pigment ink are used properly alternately, the mixed deposit of the dye ink and the pigment ink can be scraped off using the inkjet recording apparatus according to the present invention.

Next hereinbelow, with respect to the maintaining and recovering unit 71 in the inkjet recording apparatus according to the present invention, explanations are given.

As shown in FIGS. 14 and 15, first, when the motor 231 is rotated normally, the motor gear 232, the pump gear 234, the intermediate gears 235, 236 and 237 are rotated and the tube pump 220 is operated, so that the inside of the most right (in the side of the recording region) cap which is connected with the pump through the tube 219 is absorbed. Other gears are not operated, since the one way crutch is not connected.

When the motor 231 is rotated reversely, the one way crutch 237 is connected and from the motor 231 to the cam axis are rotated. The tube pump 220 is rotated reversely, however is not operated as the pump.

To the cam axis 221, the carriage lock cam 227, the cap cams 222A and 222B, the wiper cam 224, the wiper cleaner cam 228 and the cam for the home position sensor 241 are attached so that they are rotated as integrated parts.

The carriage lock 215 is biased upwards (in the direction of "locking") by a compression spring (not illustrated in FIGS. 14 and 15). The carriage lock 215 moves upwards and downwards by the carriage lock arm 217 contacted with the cam surface of the carriage lock cam 227.

The caps 72A and 72B and the cap holder 212A move upwards and downwards by the cap cams 222A and 222B.

The wiper 73 moves upwards and downwards by the wiper cam 228.

The wiper cleaner 218 is biased by a spring in the direction of departing from the wiper 73 and is operated toward the wiper by the wiper cleaner cam 218. While the wiper 73 falls between the wiper cleaner 218 and the receiver of the blanc-delivery, the ink attached to the wiper 73 is scraped off into the receiver for the blanc-delivery.

To the maintaining unit main body, a sensor (a photo interrupter/not illustrated in FIGS. 14 and 15) is fixed and the composition is so preset that when the cap is moved by the home position cam to the lowest position, the HP lever (not illustrated in FIGS. 14 and 15) is operated and the sensor is opened, so that the sensor detects the home positions of the motors (except the pump) (in other cases, the HP lever is not operated and the sensor is always closed.).

At the time the power source is applied, the cap is moved upwards and downwards irrespective of the positions of the caps 72A and 72B and the cap holders 212A and 212B (until the start of the moving, the detection of the position is not performed). After the cap has detected the home position of the cap (during the rising), the cap is moved in a specified amount and to the lowest position. Thereafter, the carriage is moved right and left and after the carriage detects the position, the carriage returns to the position of capping, so that the carriage is capped.

When the motor is rotated reversely, as the order of the operation, the series of the operation comprising the rising of the cap (the carriage lock is almost simultaneously performed), the falling of the cap (the carriage lock is almost simultaneously performed), the opening of the home position sensor, the rising of the wiper, the start of the operation of the wiper cleaner (the wiper is pressed to the receiver of the blanc-delivery), the falling of the wiper (the wiper is scrubbed by the wiper cleaner) and the returning of the wiper cleaner to the home position thereof, are repeated.

The inkjet recording apparatus and inkjet recording process according to the present invention can be applied to various recording according to the inkjet recording system, for example particularly preferably to the inkjet recording printer, the facsimile apparatus, the copy apparatus and a printer/facsimile/copier composite apparatus.

Ink Record

The record recorded by the inkjet recording apparatus and inkjet recording process according to the present invention is the ink record according to the present invention. The ink record according to the present invention comprises an image formed on a recording medium using the recording ink according to the present invention.

The recording medium is not restricted and may be properly selected depending on the application. Examples of the recording medium include the normal paper, the glossy paper, the specified paper, the cloth, the film and the OHP sheet. These recording media may be used individually or in combination.

The record has a high image quality and no spread of the ink, is excellent in the aging stability and can be preferably used in various applications, such as various materials in which letters are printed or images are recorded.

Hereinbelow, explanations are given with respect to Examples according to the present invention, which should not be construed as limiting the scope of the present invention.

Production Example 1

Producing of Dye Ink Having High Viscosity By Increasing Amount of Wetting Agent 44% by mass of a C.I.Direct blue 199 (having a solid content of 10.25% by mass), 36% by mass of diethylene glycol (DEG), 12% by mass of glycerin (GLY), 2% by mass of 2-ethyl-1,3-hexanediol, 2% by mass of a nonionic surfactant (polyoxy alkylene derivative), 0.2% by mass of a benzisothiazoline antiseptic and anti-fungus agent (relative to 100% by mass of the mass of the dye ink composition) and a proper amount of water were mixed and pH of the resultant mixture was adjusted with lithium hydroxide, thereby producing the dye ink of Production Example 1.

Production Example 2

Producing of Dye Ink having High Viscosity by Increasing Amount of Wetting Agent 44% by mass of a C.I. Direct blue 199 (having a solid content of 10.25% by mass), 30.75% by mass of 1,3 butanediol (1,3-BD), 10.25% by mass of glycerin, 2% by mass of 2-ethyl-1,3-hexanediol, 2% by mass of a nonionic surfactant (polyoxy alkylene derivative), 0.2% by mass of a benzisothiazoline antiseptic and anti-fungus agent (relative to 100% by mass of the mass of the dye ink composition) and a proper amount of water were mixed and pH of the resultant mixture was adjusted with lithium hydroxide, thereby producing the dye ink of Production Example 2.

Production Example 3

Producing of Dye Ink having High Viscosity by Increasing Amount of Wetting Agent 44% by mass of a C.I. Direct blue 199 (having a solid content of 10.25% by mass), 31.50% by mass of 1.1.1-tris (hydroxymethyl)propane (TMP), 10.50% by mass of glycerin, 2% by mass of 2-ethyl-1,3-hexanediol, 2% by mass of a nonionic surfactant (polyoxy alkylene derivative), 0.2% by mass of a benzisothiazoline antiseptic and anti-fungus agent (relative to 100% by mass of the mass of the dye ink composition) and a proper amount of water were mixed and pH of the resultant mixture was adjusted with lithium hydroxide, thereby producing the dye ink of Preparation Example 3.

Production Example 4

Producing of Dye Ink having High Viscosity by Increasing Amount of Wetting Agent 44% by mass of a C.I.Direct blue 199 (having a solid content of 10.25% by mass), 35.25% by mass of triethylene glycol (TEG), 11.75% by mass of glycerin, 2% by mass of 2-ethyl-1,3-hexanediol, 2% by mass of a nonionic surfactant (polyoxy alkylene derivative), 0.2% by mass of a benzisothiazoline antiseptic and anti-fungus agent (relative to 100% by mass of the mass of the dye ink composition) and a proper amount of water were mixed and pH of the resultant mixture was adjusted with lithium hydroxide, thereby producing the dye ink of Production Example 4.

Production Example 5

Producing of Dye Ink having High Viscosity by Increasing Amount of Wetting Agent 44% by mass of a C.I. Direct blue 199 (having a solid content of 10.25% by mass), 36% by mass of diethylene glycol, 12% by mass of glycerin, 2% by mass of 2-ethyl-1,3-hexanediol, 2% by mass of a nonionic surfactant (polyoxy alkylene derivative), 0.2% by mass of a benzisothiazoline antiseptic and anti-fungus agent, 0.03% by mass of a self-emulsifiable silicone anti-foaming agent (manufactured and sold by Shin-Etsu Chemical Co., Ltd.; trade name: KS 531) (relative to 100% by mass of the mass of the dye ink composition) and a proper amount of water were mixed and pH of the resultant mixture was adjusted with lithium hydroxide, thereby producing the dye ink of Production Example 5.

Production Example 6

Producing of Dye Ink having High Viscosity by Increasing Amount of Wetting Agent 44% by mass of a C.I. Direct blue 199 (having a solid content of 10.25% by mass), 30.75% by mass of 1,3-butanediol, 10.25% by mass of glycerin, 2% by mass of 2-ethyl-1,3-hexanediol, 2% by mass of a nonionic surfactant (polyoxy alkylene derivative), 0.2% by mass of a benzisothiazoline antiseptic and anti-fungus agent, 0.03% by mass of a silicone anti-foaming agent (manufactured and sold by Shin-Etsu Chemical Co., Ltd.; trade name: KM 72 F) (relative to 100% by mass of the mass of the dye ink composition) and a proper amount of water were mixed and pH of the resultant mixture was adjusted with lithium hydroxide, thereby producing the dye ink of Production Example 6.

Production Example 7

Producing of Dye Ink having High Viscosity by Increasing Amount of Wetting Agent 44% by mass of a C.I. Direct blue 199 (having a solid content of 10.25% by mass), 31.50% by mass of 1.1.1-tris (hydroxymethyl propane), 10.25% by mass of glycerin, 2% by mass of 2-ethyl-1,3-hexanediol, 2% by mass of a nonionic surfactant (polyoxy alkylene derivative), 0.2% by mass of a benzisothiazoline antiseptic and anti-fungus agent, 0.03% by mass of a silicone anti-foaming agent (manufactured and sold by Shin-Etsu Chemical Co., Ltd.; trade name: KS 531) (relative to 100% by mass of the mass of the dye ink composition) and a proper amount of water were mixed and pH of the resultant mixture was adjusted with lithium hydroxide, thereby producing the dye ink of Production Example 7.

Production Example 8

Producing of Dye Ink having High Viscosity by Increasing Amount of Wetting Agent 44% by mass of a C.I. Direct blue 199 (having a solid content of 10.25% by mass), 35.25% by mass of triethylene glycol, 10.25% by mass of glycerin, 2% by mass of 2-ethyl-1,3-hexanediol, 2% by mass of a nonionic surfactant (polyoxyalkylene derivative), 0.2% by mass of a benzisothiazoline antiseptic and anti-fungus agent, 0.03% by mass of a self-emulsifiable silicone anti-foaming agent (manufactured and sold by Shin-Etsu Chemical Co., Ltd.; trade name: KM 72 F) (relative to 100% by mass of the mass of the dye ink composition) and a proper amount of water were mixed and pH of the resultant mixture was adjusted with lithium hydroxide, thereby producing the dye ink of Production Example 8.

Figure 16:
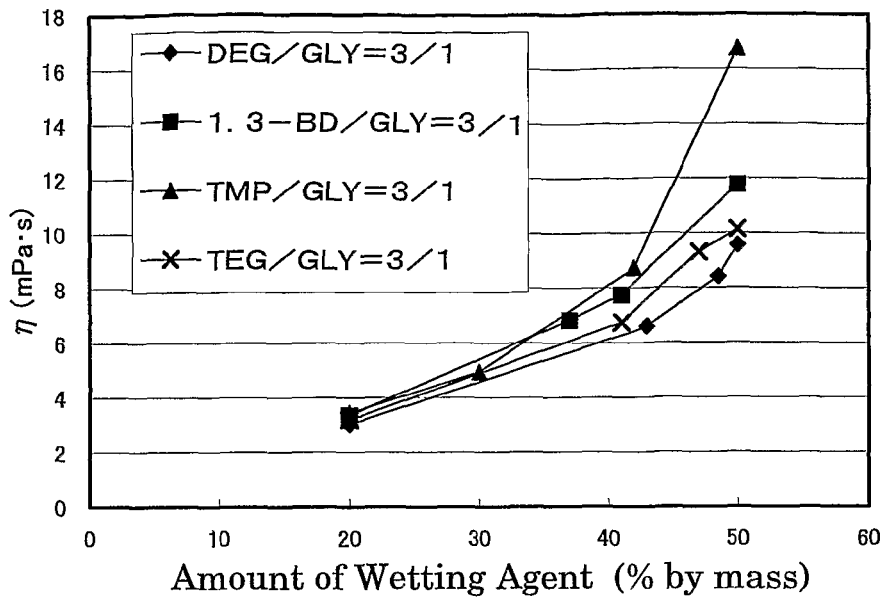
FIG. 16 is a graph showing an example of the relationship between the amount of the wetting agent in the dye ink and the viscosity of the dye ink.

Here, the relationship between the amounts of various wetting agents in the cyan dye inks obtained in Production Examples 1 to 4 and the viscosity of the cyan dye inks is shown in FIG. 16. From the result shown in FIG. 16, it is confirmed that the dye ink exhibiting preferred properties as the dye ink is the dye ink having a viscosity of 5 mPa·s to 10 mPa·s and the corresponding total amount of the wetting agent of 35% by mass to 50% by mass. When the amount of the wetting agent is too large, while the dye ink has a high viscosity, the show-through of the image is frequently caused. On the other hand, when the amount of the wetting agent is too small, the dye ink has a low viscosity, so that the rendering of the dye ink to large particles is destabilized.

Production Example 9

Producing of Dye Ink having High Viscosity by Increasing Amount of Wetting Agent 3.75% by mass of a magenta dye 1 (azo magenta dye), 1.25% by mass of C.I. Acid Violet 102, 37.5% by mass of diethylene glycol, 12.5% by mass of glycerin, 2% by mass of 2-ethyl-1,3-hexanediol, 2% by mass of a nonionic surfactant (R—(OCH$_2$CH$_2$)$_n$OH, wherein "R" represents a group of C$_{13}$H$_{27}$— and "n" is an integer of 3), 0.2% by mass of a benzisothiazoline antiseptic and anti-fungus agent (sodium sorbate) (relative to 100% by mass of the mass of the dye ink composition) and a proper amount of water were mixed and pH of the resultant mixture was adjusted with lithium hydroxide, thereby producing the dye ink of Production Example 9.

Production Example 10

Producing of Dye Ink having High Viscosity by Increasing Amount of Wetting Agent 3.75% by mass of a magenta dye 1 (azo magenta dye), 1.25% by mass of C.I. Acid Violet 102, 37.5% by mass of diethylene glycol, 12.5% by mass of glycerin, 2% by mass of 2-ethyl-1,3-hexanediol, 2% by mass of a nonionic surfactant (R—(OCH$_2$CH$_2$)$_n$OH, wherein "R" represents a group of C$_{13}$H$_{27}$— and "n" is an integer of 3), 0.2% by mass of a benzisothiazoline antiseptic and anti-fungus agent (sodium sorbate), 0.03% by mass of an emulsion silicone anti-foaming agent (manufactured and sold by Nippon Unicar Company Limited; trade name: SAG 30) (relative to 100% by mass of the mass of the dye ink composition) and a proper amount of water were mixed and pH of the resultant mixture was adjusted with lithium hydroxide, thereby producing the dye ink of Production Example 10.

Production Example 11

Producing of Dye Ink having High Viscosity by Increasing Amount of Wetting Agent 44% by mass of a C.I. Direct blue 199 (having a solid content of 10.25% by mass), 15% by mass of diethylene glycol, 5% by mass of glycerin, 2% by mass of 2-ethyl-1,3-hexanediol, 2% by mass of a nonionic surfactant (polyoxyalkylene derivative), 0.2% by mass of a benzisothiazoline antiseptic and anti-fungus agent (relative to 100% by mass of the mass of the dye ink composition) and a proper amount of water were mixed and pH of the resultant mixture was adjusted with lithium hydroxide, thereby producing the dye ink of Production Example 11.

With respect to the dye inks obtained in Production Examples 1 to 11, pH, the viscosity and the surface tension were measured according to the following measuring methods. The result of the measurements is shown in Table 1.

<Measurement of pH>

The measurement of pH was performed using a pH meter (manufactured and sold by Toa Denpa Kogyo Co., Ltd.; trade name: METER MODEL HM3A) at 23° C.

<Measurement of Viscosity>

The measurement of the viscosity was performed using a viscosity measuring apparatus (manufactured and sold by Toki Sangyo Co., Ltd.; trade name: R 500 rotating viscometer) at 25° C. The measurement of the viscosity was performed under the condition where a standard cone (having a cone angle of 1°34' and a outer diameter R of 24 mm) was used and the rotation rate was a proper rotation rate in the range of from 40 rpm to 180 rpm.

<Measurement of Surface Tension>

The measurement of the surface tension was performed using a surface tension measuring apparatus (manufactured and sold by Kyowa Interface Science Co., Ltd.; trade name: CBVP-Z) and a platinum plate at 25° C. as a static surface tension.

TABLE 1

| | pH | Surface Tension (25° C.) | Viscosity (25° C.) |
|---|---|---|---|
| Production Example 1 | 10.8 | 28.6 mN/m | 8.41 mPa · sec |
| Production Example 2 | 10.2 | 30.2 mN/m | 7.76 mPa · sec |
| Production Example 3 | 10.2 | 30.5 mN/m | 8.73 mPa · sec |
| Production Example 4 | 10.5 | 28.3 mN/m | 8.40 mPa · sec |
| Production Example 5 | 10.8 | 28.6 mN/m | 8.50 mPa · sec |
| Production Example 6 | 10.2 | 28.0 mN/m | 7.82 mPa · sec |
| Production Example 7 | 10.2 | 28.1 mN/m | 8.82 mPa · sec |
| Production Example 8 | 10.5 | 28.1 mN/m | 8.45 mPa · sec |
| Production Example 9 | 10.3 | 30.0 mN/m | 9.00 mPa · sec |
| Production Example 10 | 10.2 | 29.0 mN/m | 9.05 mPa · sec |
| Production Example 11 | 10.5 | 27.8 mN/m | 3.03 mPa · sec |

Production Example 12

Producing of Dye Ink having High Viscosity by Increasing Amount of Surfactant

44% by mass of a C.I. Direct blue 199 (having a solid content of 10.25% by mass), 15% by mass of diethylene glycol, 5% by mass of glycerin, 2% by mass of 2-ethyl-1,3-hexanediol, 9.2% by mass of a nonionic surfactant (polyoxyalkylene derivative), 0.2% by mass of a benzisothiazoline antiseptic and anti-fungus agent (relative to 100% by mass of the mass of the dye ink composition) and a proper amount of water were mixed and pH of the resultant mixture was adjusted with lithium hydroxide, thereby producing the dye ink of Production Example 12.

Production Example 13

Producing of Dye Ink having High Viscosity by Increasing Amount of Surfactant

44% by mass of a C.I. Direct blue 199 (having a solid content of 10.25% by mass), 15% by mass of diethylene glycol, 5% by mass of glycerin, 2% by mass of 2-ethyl-1,3-hexanediol, 11.2% by mass of an anionic surfactant ($R^1$—O—$(CH_2CH_2O)_nCH_2COOM$, wherein "$R^1$" represents a group of $C_{13}H_{27}$—, "M" represents a sodium atom (Na) and "n" is an integer of 3), 0.2% by mass of a benzisothiazoline antiseptic and anti-fungus agent (relative to 100% by mass of the mass of the dye ink composition) and a proper amount of water were mixed and pH of the resultant mixture was adjusted with lithium hydroxide, thereby producing the dye ink of Production Example 13.

Production Example 14

Producing of Dye Ink having High Viscosity by Increasing Amount of Surfactant

44% by mass of a C.I. Direct blue 199 (having a solid content of 10.25% by mass), 15% by mass of diethylene glycol, 5% by mass of glycerin, 2% by mass of 2-ethyl-1,3-hexanediol, 9.2% by mass of a nonionic surfactant (polyoxy alkylene derivative), 0.2% by mass of a benzisothiazoline antiseptic and anti-fungus agent, 0.03% by mass of a self-emulsifiable silicone anti-foaming agent (manufactured and sold by Shin-Etsu Chemical Co., Ltd.; trade name: KM 72F) (relative to 100% by mass of the mass of the dye ink composition) and a proper amount of water were mixed and pH of the resultant mixture was adjusted with lithium hydroxide, thereby producing the dye ink of Production Example 14.

Production Example 15

Producing of Dye Ink having High Viscosity by Increasing Amount of Surfactant

44% by mass of a C.I. Direct blue 199 (having a solid content of 10.25% by mass), 15% by mass of diethylene glycol, 5% by mass of glycerin, 2% by mass of 2-ethyl-1,3-hexanediol, 11.2% by mass of an anionic surfactant ($R^1$—O—$(CH_2CH_2O)_nCH_2COOM$, wherein "$R^1$" represents a group of $C_{13}H_{27}$—, "M" represents a sodium atom (Na) and "n" is an integer of 3), 0.2% by mass of a benzisothiazoline antiseptic and anti-fungus agent, 0.03% by mass of a self-emulsifiable silicone anti-foaming agent (manufactured and sold by Shin-Etsu Chemical Co., Ltd.; trade name: KS 531) (relative to 100% by mass of the mass of the dye ink composition) and a proper amount of water were mixed and pH of the resultant mixture was adjusted with lithium hydroxide, thereby producing the dye ink of Production Example 15.

Production Example 16

Producing of Dye Ink having High Viscosity by Increasing Amount of Surfactant

44% by mass of a C.I. Direct blue 199 (having a solid content of 10.25% by mass), 15% by mass of diethylene glycol, 5% by mass of glycerin, 2% by mass of 2-ethyl-1,3-hexanediol, 2% by mass of a nonionic surfactant (polyoxy alkylene derivative), 0.2% by mass of a benzisothiazoline antiseptic and anti-fungus agent (relative to 100% by mass of the mass of the dye ink composition) and a proper amount of water were mixed and pH of the resultant mixture was adjusted with lithium hydroxide, thereby producing the dye ink of Production Example 16.

With respect to the dye inks obtained in Production Examples 12 to 16, pH, the viscosity and the surface tension were measured according to the following measuring methods. The result of the measurements is shown in Table 2.

<Measurement of pH>

The measurement of pH was performed using a pH meter (manufactured and sold by Toa Denpa Kogyo Co., Ltd.; trade name: METER MODEL HM3A) at 23° C.

<Measurement of Viscosity>

The measurement of the viscosity was performed using a viscosity measuring apparatus (manufactured and sold by Toki Sangyo Co., Ltd.; trade name: R 500 rotating viscometer) at 25° C. The measurement of the viscosity was performed under the condition where a standard cone (having a cone angle of 1°34' and a outer diameter R of 24 mm) was used and the rotation rate was a proper rotation rate in the range of from 40 rpm to 180 rpm.

<Measurement of Surface Tension>

The measurement of the surface tension was performed using a surface tension measuring apparatus (manufactured and sold by Kyowa Interface Science Co., Ltd.; trade name: CBVP-Z) and a platinum plate at 25° C. as a static surface tension.

TABLE 2

|  | pH | Surface Tension (25° C.) | Viscosity (25° C.) |
| --- | --- | --- | --- |
| Production Example 12 | 10.3 | 28.0 mN/m | 8.18 mPa·sec |
| Production Example 13 | 10.2 | 28.0 mN/m | 7.77 mPa·sec |
| Production Example 14 | 10.2 | 28.2 mN/m | 8.19 mPa·sec |
| Production Example 15 | 10.1 | 28.0 mN/m | 7.82 mPa·sec |
| Production Example 16 | 10.5 | 27.8 mN/m | 3.03 mPa·sec |

Figure 17:
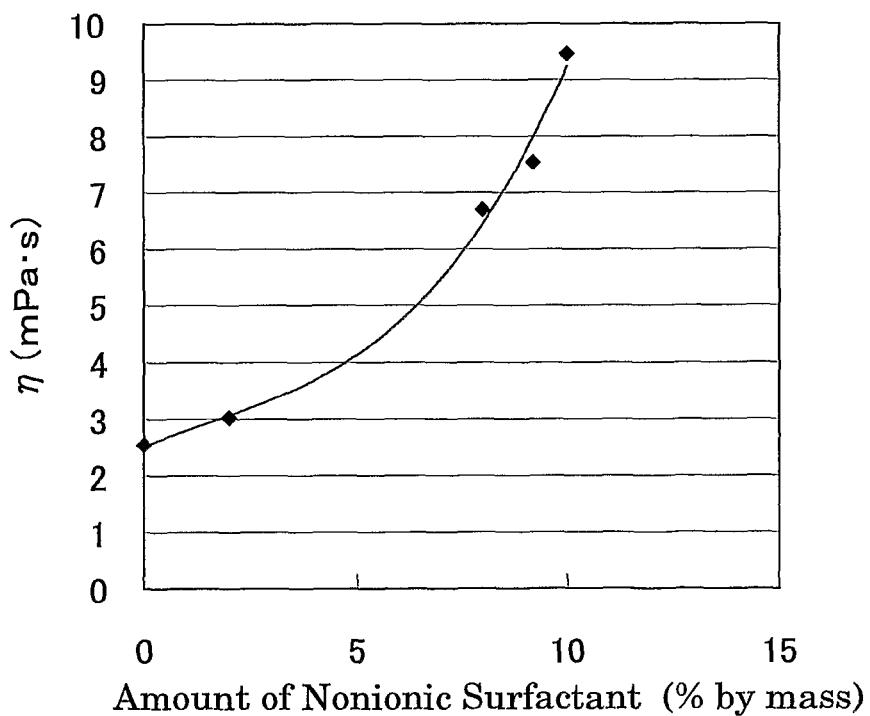
FIG. 17 is a graph showing an example of the relationship between the amount of the nonionic surfactant in the dye ink and the viscosity of the dye ink.
Figure 18:
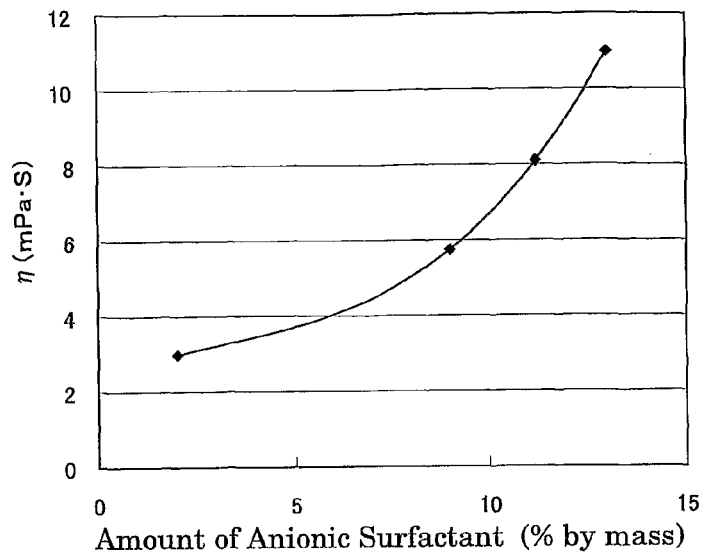
FIG. 18 is a graph showing an example of the relationship between the amount of the anionic surfactant in the dye ink and the viscosity of the dye ink.

Here, the relationship between the amount of the nonionic surfactant used in Production Example 12 and the viscosity of the dye ink produced in Production Example 12 is shown in FIG. 17 and the relationship between the amount of the anionic surfactant used in Production Example 13 and the viscosity of the dye ink produced in Production Example 13 is shown in FIG. 18. From the result shown in FIGS. 17 and 18, it is confirmed that when the amount of the surfactant is 7% by mass or more, the produced dye ink has the viscosity of 5 mPa·s or more. In the case where by increasing the amount of the surfactant, the viscosity of the produced dye ink is rendered high, when the viscosity is more than 5 mPa·s or more (the amount of the surfactant is 7% by mass or more), there is such an advantage that even if the image density in the surface of the paper is high, the show-through of the image does not become large.

For example, in the cases where the printing is performed by fixing the drop amount at about 15 pL per one drop of the ink, the image density in the plain paper becomes higher accompanying with increasing the amount of the surfactant and the viscosity of the dye ink as follows. The amount of the surfactant (the viscosity of the dye ink) was increased in such an order as in Production Example 16 (the image density was 1.23), in Production Example 13 (the image density was 1.27) and in Production Example 12 (the image density was 1.3). The show-through of the image was 0.08 in each of the above-noted three Production Examples. With respect to the image quality, the higher the viscosity of the dye ink, the lesser the cause of the feathering. Needless to say, since the pigment ink is used in combination with the dye ink having a high viscosity which is a similar viscosity to that of the pigment ink, the printing using the pigment ink and the dye ink properly alternately can be performed without problem.

The image density was measured using a color spectro-photo-densitometer utilizing the reflection (manufactured and sold by X-Rite, Corporation, U.S.A.). Thus, by rendering the viscosity of both the pigment ink and the dye ink high, the printing using the pigment ink and the dye ink properly alternately can be stably performed and both such a pigment ink and such a dye ink are advantageous with respect to the formed image.

Experiment

Preparing of Dye Ink having High Viscosity by Incorporating Arginic Acid in Ink Composition 44% by mass of a cyan dye C.I. Direct blue 199 (having a solid content of 10.25% by mass), 15% by mass of 1,3-butanediol, 5% by mass of glycerin, 2% by mass of 2-ethyl-1,3-hexanediol and 0.2% by mass of a benzisothiazoline antiseptic and anti-fungus agent (relative to 100% by mass of the mass of the dye ink composition) were mixed, thereby preparing the basic ink composition for the experiment of the viscosity controlling. First, in the basic ink composition, 0% by mass, 2% by mass and 4% by mass of an alginic acid (relative to 100% by mass of the mass of the dye ink composition) were respectively incorporated, thereby obtaining three types of the experimental ink composition for the experiment of the viscosity controlling. Next, in each of the above-obtained three types of the experimental ink composition, 2% by mass, 5% by mass and 8% by mass of a nonionic surfactant (polyoxy alkylene derivative) (relative to 100% by mass of the mass of the dye ink composition) were respectively incorporated, thereby obtaining nine types of the experimental ink composition for the experiment of the viscosity controlling. With respect to six types among the obtained nine types of the experimental ink composition, the viscosity was measured. The result of the measurement is shown in FIG. 19.

The used alginic acid is an alginic acid having the ratio D-mannuronic acid/L-glucuronic acid of about 0.47 and having an extremely low viscosity (i.e., 5.0 mPa·s measured as the viscosity of a neutralized 10% by mass aqueous solution of the alginic acid at 20° C.)

Since when the amount of the alginic acid is more than 4% by mass, the amount of particles having a large diameter is increased, so that the filtration rate of the produced dye ink is lowered, the amount of the alginic acid is preferably 4% by mass or less. From the result shown in FIG. 19, it is confirmed that by incorporating a combination of 2% by mass to 4% by mass of the alginic acid and 2% by mass to 8% by mass of the nonionic surfactant in the dye ink composition, the dye ink having a viscosity of 5 mPa·s to 10 mPa·s can be produced. By using these high-viscosity dye ink, the printing using the high-viscosity dye ink and the high-viscosity pigment ink properly alternately can be stably performed with a rare omission of ink delivery due to a nozzle trouble. Particularly when a viscosity enhancing agent, such as an alginic acid is incorporated in the dye ink composition, a high image quality having a high image density, a rare show-through and a rare feathering.

Figure 19:
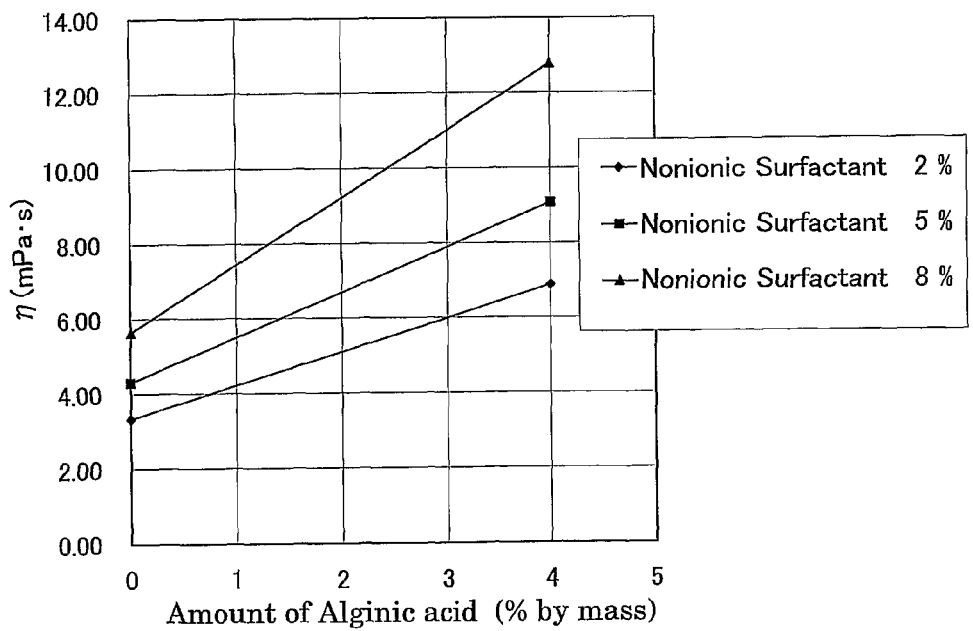
FIG. 19 is a graph showing an example of the relationship between the amount of the alginic acid in the dye ink and the viscosity of the dye ink.

In FIG. 19, examples of the dye inks produced using a cyan dye (C.I. D Blue 199) are shown; however the result of the measurements measured with respect to the dye inks produced using a magenta dye or a yellow dye was similar to that measured with respect to the above-noted dye inks.

Production Example 17

Producing of Dye Ink having High Viscosity by Incorporating Arginic Acid in Ink Composition 44% by mass of a cyan dye C.I. Direct blue 199 (having a solid content of 10.25% by mass), 15% by mass of 1,3-butanediol, 5% by mass of glycerin, 2% by mass of 2-ethyl-1,3-hexanediol and 0.2% by mass of a benzisothiazoline antiseptic and anti-fungus agent, 2% by mass of an alginic acid, 6.5% by mass of a nonionic surfactant (polyoxy alkylene derivative) (relative to 100% by mass of the mass of the dye ink composition) and a proper amount of water were mixed and pH of the resultant mixture was adjusted with lithium hydroxide, thereby producing the dye ink of Production Example 17.

Production Example 18

Producing of Dye Ink having High Viscosity by Incorporating Arginic Acid in Ink Composition 44% by mass of a cyan dye C.I. Direct blue 199 (having a solid content of 10.25% by mass), 15% by mass of 1,3-butanediol, 5% by mass of glycerin, 2% by mass of 2-ethyl-1,3-hexanediol, 0.2% by mass of a benzisothiazoline antiseptic and anti-fungus agent, 2% by mass of an alginic acid, 6.5% by mass of a nonionic surfactant (polyoxy alkylene derivative), 0.03% by mass of a self-emulsifiable silicone anti-foaming agent (manufactured and sold by Shin-Etsu Chemical Co., Ltd.; trade name: KS 531) (relative to 100% by mass of the mass of the dye ink composition) and a proper amount of water were mixed and pH of the resultant mixture was adjusted with lithium hydroxide, thereby producing the dye ink of Production Example 18.

Production Example 19

Producing of Dye Ink having High Viscosity by Incorporating Arginic Acid in Ink Composition 44% by mass of a cyan dye C.I. Direct blue 199 (having a solid content of 10.25% by mass), 15% by mass of 1,3-butanediol, 5% by mass of glycerin, 2% by mass of 2-ethyl-1,3-hexanediol, 0.2% by mass of a benzisothiazoline antiseptic and anti-fungus agent, 2% by mass of an alginic acid, 5% by mass of a nonionic surfactant (polyoxy alkylene derivative) (relative to 100% by mass of the mass of the dye ink composition) and a proper amount of water were mixed and pH of the resultant mixture was adjusted with lithium hydroxide, thereby producing the dye ink of Production Example 19.

With respect to the dye inks obtained in Production Examples 17 to 19, pH, the viscosity and the surface tension were measured according to the following measuring methods. The result of the measurements is shown in Table 3.

<Measurement of pH>

The measurement of pH was performed using a pH meter (manufactured and sold by Toa Denpa Kogyo Co., Ltd.; trade name: METER MODEL HM3A) at 23° C.

<Measurement of Viscosity>

The measurement of the viscosity was performed using a viscosity measuring apparatus (manufactured and sold by Toki Sangyo Co., Ltd.; trade name: R 500 rotating viscometer) at 25° C. The measurement of the viscosity was performed under the condition where a standard cone (having a cone angle of 1°34' and a outer diameter R of 24 mm) was used and the rotation rate was a proper rotation rate in the range of from 40 rpm to 180 rpm.

<Measurement of Surface Tension>

The measurement of the surface tension was performed using a surface tension measuring apparatus (manufactured and sold by Kyowa Interface Science Co., Ltd.; trade name: CBVP-Z) and a platinum plate at 25° C. as a static surface tension.

TABLE 3

| | pH | Surface Tension (25° C.) | Viscosity (25° C.) |
|---|---|---|---|
| Production Example 17 | 10.1 | 28.9 mN/m | 6.8 mPa · sec |
| Production Example 18 | 10.2 | 28.2 mN/m | 6.8 mPa · sec |
| Production Example 19 | 10.1 | 29.8 mN/m | 4.1 mPa · sec |

Preparation Example 1

Preparing of Polymer Fine Particles Dispersion Comprising Copper Phthalocyanine Pigment According to a preparing method of the preparation example 3 disclosed in JP-A No. 2001-139849, a blue polymer fine particles dispersion was prepared.

With respect to the prepared fine particles dispersion, the volume average particle diameter (D50%) was measured using a particle size distribution measuring apparatus (manufactured and sold by Nikkiso Co., Ltd.; trade name: Microtrack UPA) and found to be 93 nm.

Preparation Example 2

Preparing of Polymer Fine Particles Dispersion Comprising Dimethylquinacridone Pigment A reddish-purple polymer fine particles dispersion was prepared in substantially the same manner as in preparation example 1, except that the copper phthalocyanine pigment was changed to the Pigment Red 122.

With respect to the prepared fine particles dispersion, the volume average particle diameter (D50%) was measured using a particle size distribution measuring apparatus (manufactured and sold by Nikkiso Co., Ltd.; trade name: Microtrack UPA) and found to be 127 nm.

Preparation Example 3

Preparing of Polymer Fine Particles Dispersion Comprising Monoazo Yellow Pigment A reddish-purple polymer fine particles dispersion was prepared in substantially the same manner as in preparation example 1, except that the copper phthalocyanine pigment was changed to the Pigment Yellow 74.

With respect to the prepared fine particles dispersion, the volume average particle diameter (D50%) was measured using a particle size distribution measuring apparatus (manufactured and sold by Nikkiso Co., Ltd.; trade name: Microtrack UPA) and found to be 76 nm.

Preparation Example 4

Preparing of Fine Particles Dispersion Comprising Carbon Black Subjected to Diazo Compound Treatment 100 g of a carbon black having a surface area of 230 $m^2/g$ and a DBP oil absorption of 70 mL/100 g and 34 g of p-amino-N-benzoic acid were mixed and dispersed in 750 g of water and to the resultant dispersion, 16 g of nitric acid were dropped, followed by stirring the dispersion at 70° C. After 5 minutes, to the dispersion, a solution in which 11 g of sodium nitrite was dissolved in 50 g of water was added and the dispersion was stirred for 1 hour, thereby obtaining a slurry. The obtained slurry was subjected to the treatments, such as a ten-times diluting treatment, a centrifuging treatment for removing bulky particles from the slurry, a pH adjusting treatment using diethanol amine for adjusting pH of the slurry to 8 to 9 and a desalting and condensation treatment using an ultrafiltration membrane, thereby obtaining a carbon black dispersion having a pigment content of 15% and the obtained carbon black dispersion was filtered using a polypropylene filter having a pore size of 0.5 μm, thereby preparing the carbon black dispersion of Production Example 4.

With respect to the prepared fine particles dispersion, the volume average particle diameter (D50%) was measured using a particle size distribution measuring apparatus (manufactured and sold by Nikkiso Co., Ltd.; trade name: Microtrack UPA) and found to be 99 nm.

Next, using the polymer fine particles dispersions and the carbon black dispersion prepared in Preparation Examples 1 to 4, the pigment inks were produced as follows.

Production Example 20

Pigment Ink Set

<Production of Cyan Ink>

10.0% by mass (as a solid amount) of a polymer fine particles dispersion comprising a phthalocyanine pigment (prepared in Preparation Example 1), 22% by mass of 1,3-butanediol, 9.0% by mass of glycerol, 2.2% by mass of a nonionic surfactant (polyoxy alkylene derivative), 1.8% by mass of 2-ethyl-1,3-hexanediol, 0.2% by mass of a benzisothiazoline antiseptic and anti-fungus agent, 0.1% by mass of a silicone anti-foaming agent (relative to 100% by mass of the mass of the pigment ink composition) and a proper amount of an ion-exchanged water were mixed and stirred and the resultant mixture was subjected to the treatments, such as a pH adjusting treatment using an organic amine pH controlling agent for adjusting pH of the mixture to 9.5 and a filtration treatment using a membrane filter having a pore size of 0.8 μm, thereby preparing the cyan pigment ink of Production Example 20.

With respect to the obtained cyan pigment ink, the viscosity and surface tension of the ink at 25° C. were measured and found to be, respectively 8.05 mPa·s and 29.4 mN/m.

The measurement of the viscosity was performed using a viscosity measuring apparatus (manufactured and sold by Toki Sangyo Co., Ltd.; trade name: R 500 rotating viscometer) at 25° C.

The measurement of the surface tension was performed using a surface tension measuring apparatus (manufactured and sold by Kyowa Interface Science Co., Ltd.; trade name: CBVP-Z) and a platinum plate at 25° C. as a static surface tension.

<Preparing of Magenta Ink>

10.0% by mass (as a solid amount) of a polymer fine particles dispersion comprising a dimethylquinacridone (prepared in Preparation Example 2), 24.0% by mass of triethylene glycol, 8.3% by mass of glycerol, 2.0% by mass of a nonionic surfactant (polyoxy alkylene derivative), 1.5% by mass of 2-ethyl-1,3-hexanediol, 0.07% by mass of an antiseptic agent (sodium sorbate), 0.1% by mass of a silicone anti-foaming agent (relative to 100% by mass of the mass of the pigment ink composition) and a proper amount of an ion-exchanged water were mixed and stirred and the resultant mixture was subjected to a filtration treatment using a membrane filter having a pore size of 0.8 μm, thereby preparing the magenta pigment ink of Production Example 20.

With respect to the obtained magenta pigment ink, the viscosity and surface tension of the ink at 25° C. were measured and found to be, respectively 7.95 mPa·s and 29.5 mN/m.

<Preparing of Yellow Ink>

10.0% by mass (as a solid amount) of polymer fine particles dispersion comprising a monoazo yellow pigment (prepared in Preparation Example 3), 25.0% by mass of 1,3-butanediol, 8.0% by mass of glycerol, 1.8% by mass of a nonionic surfactant (polyoxy alkylene derivative), 1.8% by mass of 2,2,4-trimethyl-1,3-pentanediol, 0.05% by mass of an antiseptic agent (sodium sorbate), 0.1% by mass of a silicone anti-foaming agent (relative to 100% by mass of the mass of the pigment ink composition) and a proper amount of an ion-exchanged water were mixed and stirred and the resultant mixture was subjected to a filtration treatment using a membrane filter having a pore size of 0.8 μm, thereby preparing the yellow pigment ink of Production Example 20.

With respect to the obtained yellow pigment ink, the viscosity and surface tension of the ink at 25° C. were measured and found to be, respectively 8.02 mPa·s and 29.5 mN/m.

<Preparing of Black Ink>

10.0% by mass (as a solid amount) of a carbon black dispersion subjected to a diazo compound treatment (prepared in Preparation Example 4), 20.5% by mass of 1,5-pentanediol, 7.5% by mass of glycerol, 2.0% by mass of a surfactant (represented by the formula: $CH_3(CH_2)_{12}O(CH_2CH_2O)_3CH_2COOH$), 2.1% by mass of 2,2,4-trimethyl-1,3-pentanediol, 0.2% by mass of an antiseptic agent (sodium sorbate), 0.03% by mass of a silicone anti-foaming agent (manufactured and sold by Shin-Etsu Chemical Co., Ltd.; trade name: KS 531) (relative to 100% by mass of the mass of the pigment ink composition) and a proper amount of an ion-exchanged water were mixed and stirred and the resultant mixture was subjected to the treatments, such as a pH adjusting treatment using a 5% by mass aqueous solution of lithium hydroxide and a filtration treatment using a membrane filter having a pore size of 0.8 μm, thereby preparing the black pigment ink of Production Example 20.

With respect to the obtained magenta ink, the viscosity and surface tension of the ink at 25° C. were measured and found to be, respectively 8.05 mPa·s and 30.2 mN/m.

Each of the cyan pigment ink, magenta pigment ink, yellow pigment ink and black pigment ink which are produced in Production Example 20 has the surface tension and viscosity of the ink at 25° C. of respectively 40 mN/m or less and about 8.05 mPa·s. Each of them is excellent in rapid dying properties, light resistance and water resistance, when they are used in the plain paper, and has a rare spread and a rare show-through.

Examples 1 to 16 and Comparative Examples 1 to 3

In Examples 1 to 16 and Comparative Examples 1 to 3, the dye ink and the pigment ink were respectively filled in an ink cartridge and another ink cartridge of an inkjet printer (manufactured and sold by Ricoh Company, Ltd.; trade name: IPSiO G707) according to a combination shown in the following Table 4.

TABLE 4

|  | Pigment Ink | | | Dye Ink | | |
| --- | --- | --- | --- | --- | --- | --- |
|  | Type* | Viscosity (mPa·s) | Surface Tension (mN/m) | Type* | Viscosity (mPa·s) | Surface Tension (mN/m) |
| Example 1 | Pro. Ex. 20 | 8.05 | 29.4 | Pro. Ex. 1 | 8.41 | 28.6 |
| Example 2 | Pro. Ex. 20 | 8.05 | 29.4 | Pro. Ex. 2 | 7.76 | 30.2 |
| Example 3 | Pro. Ex. 20 | 8.05 | 29.4 | Pro. Ex. 3 | 8.73 | 30.5 |
| Example 4 | Pro. Ex. 20 | 8.05 | 29.4 | Pro. Ex. 4 | 8.40 | 28.3 |
| Example 5 | Pro. Ex. 20 | 8.05 | 29.4 | Pro. Ex. 5 | 8.50 | 28.6 |
| Example 6 | Pro. Ex. 20 | 8.05 | 29.4 | Pro. Ex. 6 | 7.82 | 28.0 |
| Example 7 | Pro. Ex. 20 | 8.05 | 29.4 | Pro. Ex. 7 | 8.82 | 28.1 |
| Example 8 | Pro. Ex. 20 | 8.05 | 29.4 | Pro. Ex. 8 | 8.45 | 28.1 |
| Example 9 | Pro. Ex. 20 | 7.95 | 29.5 | Pro. Ex. 9 | 9.00 | 30.0 |
| Example 10 | Pro. Ex. 20 | 7.95 | 29.5 | Pro. Ex. 10 | 9.05 | 29.0 |
| Example 11 | Pro. Ex. 20 | 8.05 | 29.5 | Pro. Ex. 12 | 8.18 | 28.0 |
| Example 12 | Pro. Ex. 20 | 8.05 | 29.4 | Pro. Ex. 13 | 7.77 | 28.0 |
| Example 13 | Pro. Ex. 20 | 8.05 | 29.4 | Pro. Ex. 14 | 8.28 | 29.2 |
| Example 14 | Pro. Ex. 20 | 8.05 | 29.4 | Pro. Ex. 15 | 7.92 | 28.0 |
| Example 15 | Pro. Ex. 20 | 8.05 | 29.4 | Pro. Ex. 17 | 6.80 | 29.2 |
| Example 16 | Pro. Ex. 20 | 8.05 | 29.4 | Pro. Ex. 18 | 6.80 | 28.9 |
| Comp. Ex. 1 | Pro. Ex. 20 | 8.05 | 29.4 | Pro. Ex. 11 | 3.03 | 27.8 |
| Comp. Ex. 2 | Pro. Ex. 20 | 8.05 | 29.4 | Pro. Ex. 16 | 3.03 | 27.8 |
| Comp. Ex. 3 | Pro. Ex. 20 | 8.05 | 29.4 | Pro. Ex. 19 | 4.10 | 29.8 | wherein "Type*" means, for example that in Example 1, as the pigment ink, the pigment ink produced in Pro. Ex. 20 (Production Example 20) was used and as the dye ink, the dye ink produced in Pro. Ex. 1 (Production Example 1) was used.

<Evaluation>

In Examples 1 to 16 and Comparative Examples 1 to 3, the printing using the pigment ink and the dye ink properly alternately through one head (with proviso that as the cartridge, a cartridge for the pigment ink and another cartridge for the dye ink were separately used) was performed by means of an inkjet printer (manufactured and sold by Ricoh Company, Ltd.; trade name: IPSiO G707) in a plain paper (Ricoh Type 6200) and in a glossy paper (Ricoh silky glossy paper) respectively.

As the result of the printing, in Examples 1 to 16, with respect to every one of the used pigment inks and dye inks, the printing with a high image quality could be obtained. In the comparison of the dye ink with the pigment ink, the dye ink has caused the show-through of the printed image more frequently than the pigment ink and was a little poorer than the pigment ink in the light resistance and the water resistance, when the printing was performed in the plain paper. On the other hand, when the printing was performed in the glossy paper, a photograph image obtained using the dye ink had more glossy feeling than a photograph image obtained using the pigment ink.

Further, by means of an inkjet printer (manufactured and sold by Ricoh Company, Ltd; trade name: IPSiO G 707) and according to a driving wave pattern of the printing by which the printing using the pigment ink having a viscosity of 8.05 mPa·s which is produced in Production Example 20 can be stably performed, the printing was performed using the dye ink having a viscosity of 4 mPa·s or less which is produced in Production Examples 11, 16 and 19. In this case, even when several drops of the ink were injected in a high speed for integrating several drops of the ink to one drop having a large particle diameter before the contacting of the ink with the paper, several drops of the above-noted dye ink could not be integrated to one drop and the form of the dot of the image had a large distribution. Therefore, it is confirmed that when by means of an inkjet printer by which the printing using the pigment ink having a high viscosity can be performed, the printing is performed using the dye ink according to a special driving wave pattern of the printing, for injecting the dye ink stably, it is necessary that the difference of the viscosity between the pigment ink and the dye ink is adjusted to 3 mPa·s or less.

During the printing, in the inkjet printer (manufactured and sold by Ricoh Company, Ltd; trade name: IPSiO G 707), the presence of the ink was detected by measuring the electrical resistance using the above-noted electrodes 141 and 142 shown in FIG. 12 and when the absence of the ink was detected, the ink was supplemented in the sub tank. However, in Production Examples 1 to 4, 10, 12 to 13 and 17 where the dye ink composition comprised no anti-foaming agent, the misdetection was sometimes caused. It is estimated that the cause of the misdetection is a foam attached to the electrode and it is also considered that the ink having a high viscosity is the cause for promoting the misdetection. Therefore, as in Production Examples 5 to 9, 14 to 15 and 18, when the dye ink comprising a silicone anti-foaming agent was used, the causing of the foaming became lesser, so that the misdetection of the electrode became lesser. Further, by incorporating the anti-foaming agent in the ink composition, the omission of the ink delivery due to the nozzle trouble caused by the foaming became lesser.

Comparative Example 4

The pigment ink was prepared as follows.

10.0% by mass (as a solid amount) of a polymer fine particles dispersion comprising a phthalocyanine pigment (prepared in Preparation Example 1), 27.75% by mass of 1,3-butanediol, 9.25% by mass of glycerol, 2.2% by mass of a nonionic surfactant (polyoxy alkylene derivative), 1.8% by mass of 2-ethyl-1,3-hexanediol, 0.2% by mass of a benzisothiazoline antiseptic and anti-fungus agent, 0.1% by mass of a silicone anti-foaming agent (relative to 100% by mass of the mass of the pigment ink composition) and a proper amount of an ion-exchanged water were mixed and stirred and the resultant mixture was subjected to the treatments, such as a pH adjusting treatment using an organic amine pH controlling agent for adjusting pH of the mixture to 9.5 and a filtration treatment using a membrane filter having a pore size of 0.8 μm, thereby preparing the cyan pigment ink of Comparative Example 4.

With respect to the obtained cyan pigment ink, the viscosity and surface tension of the ink at 25° C. were measured and found to be, respectively 11.4 mPa·s and 24.7 mN/m.
<Evaluation>

Next, the above-obtained pigment ink having a viscosity of 11.4 mPa·s and the dye ink produced in Production Example 2 having a viscosity of 7.76 mPa·s were filled respectively in a cartridge and another cartridge of the inkjet printer (manufactured and sold by Ricoh Company, Ltd; trade name: IPSiO G 707).

According to a driving wave pattern of the printing by which the pigment ink prepared in Comparative Example 4 can be stably injected, the dye ink produced in Production Example 2 was injected instead of the pigment ink prepared in Comparative Example 4 and as the result, the ink could not be stably injected and the mist of the ink was frequently caused, so that a disadvantage was caused wherein the nozzle down was frequently caused.

Comparative Example 5

The pigment ink was prepared as follows.

10.0% by mass (as a solid amount) of a polymer fine particles dispersion comprising a phthalocyanine pigment (prepared in Preparation Example 1), 13.5% by mass of 1,3-butanediol, 4.5% by mass of glycerol, 2.2% by mass of a nonionic surfactant (polyoxy alkylene derivative), 1.8% by mass of 2-ethyl-1,3-hexanediol, 0.2% by mass of a benzisothiazoline antiseptic and anti-fungus agent, 0.1% by mass of a silicone anti-foaming agent (relative to 100% by mass of the mass of the pigment ink composition) and a proper amount of an ion-exchanged water were mixed and stirred and the resultant mixture was subjected to the treatments, such as a pH adjusting treatment using an organic amine pH controlling agent for adjusting pH of the mixture to 9.5 and a filtration treatment using a membrane filter having a pore size of 0.8 μm, thereby preparing the cyan pigment ink of Comparative Example 5.

With respect to the obtained cyan pigment ink, the viscosity and surface tension of the ink at 25° C. were measured and found to be, respectively 4.8 mPa·s and 26 mN/m.
<Evaluation>

Next, the above-obtained pigment ink having a viscosity of 4.8 mPa·s and the dye ink produced in Production Example 11 having a viscosity of 3 mPa·s were filled respectively in a cartridge and another cartridge of the inkjet printer (manufactured and sold by Ricoh Company, Ltd; trade name: IPSiO G 707). In the case where the printing was performed using the pigment ink and the dye ink alternately, by rendering the injection condition suitable for the ink having a viscosity of around 4 mPa·s, both the pigment ink and the dye ink could be stably injected; however, an image having a high quality and a lesser feathering as an advantage of an ink having a high viscosity could not be obtained.

Accordingly, it is confirmed that for obtaining the dye ink having a lesser feathering, a high image density and a high image quality, the dye ink needs to have a viscosity at 25° C. of 5 mPa·s or more. In this case, particularly, the dye ink comprising a viscosity enhancing agent, such as an alginic acid, a surfactant and a resin is preferred. When by increasing the amount of the wetting agent, the viscosity of the dye is enhanced, a large amount of the wetting agent may sometimes adversely affect the show-through of the image.

Comparative Example 16

The dye ink of Comparative Example 6 was prepared in substantially the same manner as in Production Example 2, except that 2-ethyl-1,3-hexanediol and the nonionic surfactant were not incorporated in the ink composition.

With respect to the obtained dye ink, the viscosity and surface tension of the ink at 25° C. were measured and found to be, respectively 7.15 mPa·s and 43.8 mN/m.

<Evaluation>

The above-obtained dye ink of Comparative Example 6 was filled in a cartridge of the inkjet printer (manufactured and sold by Ricoh Company, Ltd; trade name: IPSiO G 707) and the printing was performed in a plain paper (Ricoh Type 6200). As the result, since the dye ink of Comparative Example 6 has a high surface tension, in the plain paper (Ricoh Type 6200), the drying rate of the ink was low and the feathering and spread of the ink were caused.

Comparative Example 7

The dye ink of Production Example 11 which has the viscosity and surface tension of the ink at 25° C. of respectively 5 mPa·s or less and 40 mN/m or less was filled in a cartridge of the inkjet printer (manufactured and sold by Ricoh Company, Ltd; trade name: IPSiO G 707) and the printing was performed according to a driving wave pattern controlled for the printing using the pigment ink having the viscosity of 8 mPa·s. As the result, the printing could not be stably performed.

Comparative Example 8

The pigment ink having a viscosity at 25° C. of 5 mPa·s which was produced in Comparative Example 5 and the dye ink produced in Production Example 11 were filled respectively in a cartridge and another cartridge of the inkjet printer (manufactured and sold by Ricoh Company, Ltd; trade name: IPSiO G 707).

As the result of the printing performed under the injecting condition adjusted for the pigment ink having a viscosity at 25° C. of 5 mPa·s, while the printing was relative stable, an image having a high quality and a lesser feathering as an advantage of an ink having a high viscosity could not be obtained.

Accordingly, from the result of Comparative Examples 6 to 8, it is confirmed that for obtaining an image having a high quality and a lesser feathering when the dye ink is used, it is necessary that the dye ink has a viscosity at 25° C. of 5 mPa·s or more.

Preparation Example 5

Preparing of Polymer Fine Particles Dispersion Comprising Copper Phthalocyanine Pigment According to a preparing method of the preparation example 3 disclosed in JP-A No. 2001-139849, a blue polymer fine particles dispersion was prepared.

With respect to the prepared fine particles dispersion, the volume average particle diameter (D50%) was measured using a particle size distribution measuring apparatus (manufactured and sold by Nikkiso Co., Ltd.; trade name: Microtrack UPA) and found to be 93 nm.

Preparation Example 6

Preparing of Polymer Fine Particles Dispersion Comprising Dimethylquinacridone Pigment A reddish-purple polymer fine particles dispersion was prepared in substantially the same manner as in preparation example 1, except that the copper phthalocyanine pigment was changed to the Pigment Red 122.

With respect to the prepared fine particles dispersion, the volume average particle diameter (D50%) was measured using a particle size distribution measuring apparatus (manufactured and sold by Nikkiso Co., Ltd.; trade name: Microtrack UPA) and found to be 127 nm.

Preparation Example 7

Preparing of Polymer Fine Particles Dispersion Comprising Monoazo Yellow Pigment A reddish-purple polymer fine particles dispersion was prepared in substantially the same manner as in preparation example 1, except that the copper phthalocyanine pigment was changed to the Pigment Yellow 74.

With respect to the prepared fine particles dispersion, the volume average particle diameter (D50%) was measured using a particle size distribution measuring apparatus (manufactured and sold by Nikkiso Co., Ltd.; trade name: Microtrack UPA) and found to be 76 nm.

Preparation Example 8

Preparing of Fine Particles Dispersion Comprising Carbon Black Subjected to Diazo Compound Treatment 100 g of a carbon black having a surface area of 230 m$^2$/g and a DBP oil absorption of 70 mL/100 g and 34 g of p-amino-N-benzoic acid were mixed and dispersed in 750 g of water and to the resultant dispersion, 16 g of nitric acid were dropped, followed by stirring the dispersion at 70° C. After 5 minutes, to the dispersion, a solution in which 11 g of sodium nitrite was dissolved in 50 g of water was added and the dispersion was stirred for 1 hour, thereby obtaining a slurry. The obtained slurry was subjected to the treatments, such as a ten-times diluting treatment, a centrifuging treatment for removing bulky particles from the slurry, a pH adjusting treatment using diethanol amine for adjusting pH of the slurry to 8 to 9 and a desalting and condensation treatment using an ultrafiltration membrane, thereby obtaining a carbon black dispersion having a pigment content of 15% and the obtained carbon black dispersion was filtered using a polypropylene filter having a pore size of 0.5 μm, thereby preparing the carbon black dispersion of Production Example 4.

With respect to the prepared fine particles dispersion, the volume average particle diameter (D50%) was measured using a particle size distribution measuring apparatus (manufactured and sold by Nikkiso Co., Ltd.; trade name: Microtrack UPA) and found to be 99 nm.

Next, using the polymer fine particles dispersions and the carbon black dispersion prepared in Preparation Examples 5 to 8, the pigment inks were produced as follows.

Production Example 21

Pigment Ink Set
<Production of Cyan Ink>

10.0% by mass (as a solid amount) of a polymer fine particles dispersion comprising a phthalocyanine pigment (prepared in Preparation Example 5), 25.0% by mass of propylene glycol, 9.5% by mass of glycerol, 2.0% by mass of a nonionic surfactant (polyoxy alkylene derivative), 2.0% by mass of 2,2,4-trimethyl-1,3-pentanediol, 0.2% by mass of a benzisothiazoline antiseptic and anti-fungus agent, 0.03% by mass of a silicone anti-foaming agent (manufactured and sold by Nippon Unicar Company Limited; trade name: SAG 30) (relative to 100% by mass of the mass of the pigment ink composition) and a proper amount of an ion-exchanged water were mixed and stirred and the resultant mixture was subjected to a filtration treatment using a membrane filter having a pore size of 0.8 μm, thereby preparing the cyan pigment ink of Production Example 21.

<Preparing of Magenta Ink>

10.0% by mass (as a solid amount) of a polymer fine particles dispersion comprising a dimethylquinacridone (prepared in Preparation Example 6), 20.0% by mass of 1,3-butanediol, 9.0% by mass of glycerol, 2.2% by mass of a nonionic surfactant (polyoxy alkylene derivative), 1.9% by mass of 2-ethyl-1,3-hexanediol, 0.07% by mass of an benzisothiazoline antiseptic and anti-fungus agent, 0.03% by mass of a silicone anti-foaming agent (relative to 100% by mass of the mass of the pigment ink composition) and a proper amount of an ion-exchanged water were mixed and stirred and the resultant mixture was subjected to a filtration treatment using a membrane filter having a pore size of 0.8 µm, thereby preparing the magenta pigment ink of Production Example 21.

<Preparing of Yellow Ink>

11.0% by mass (as a solid amount) of polymer fine particles dispersion comprising a monoazo yellow pigment (prepared in Preparation Example 7), 20.5% by mass of 1,3-butanediol, 8.5% by mass of glycerol, 2.1% by mass of a nonionic surfactant (polyoxy alkylene derivative), 1.9% by mass of 2-ethyl-1,3-hexanediol, 0.07% by mass of an benzisothiazoline antiseptic and anti-fungus agent, 0.03% by mass of a silicone anti-foaming agent (relative to 100% by mass of the mass of the pigment ink composition) and a proper amount of an ion-exchanged water were mixed and stirred and the resultant mixture was subjected to a filtration treatment using a membrane filter having a pore size of 0.8 µm, thereby preparing the yellow pigment ink of Production Example 21.

<Preparing of Black Ink>

10.0% by mass (as a solid amount) of a carbon black dispersion subjected to a diazo compound treatment (prepared in Preparation Example 8), 22.5% by mass of 1,5-pentanediol, 7.5% by mass of glycerol, 1.7% by mass of a nonionic surfactant (polyoxy alkylene derivative), 2.1% by mass of 2,2,4-trimethyl-1,3-pentanediol, 0.2% by mass of an benzisothiazoline antiseptic and anti-fungus agent, 0.1% by mass of a silicone anti-foaming agent (manufactured and sold by Shin-Etsu Chemical Co., Ltd.; trade name: KS 531) (relative to 100% by mass of the mass of the pigment ink composition) and a proper amount of an ion-exchanged water were mixed and stirred and the resultant mixture was subjected to the treatments, such as a pH adjusting treatment using an organic pH controlling agent and a filtration treatment using a membrane filter having a pore size of 0.8 µm, thereby preparing the black pigment ink of Production Example 21.

With respect to the obtained cyan pigment ink, magenta pigment ink, yellow pigment ink and black pigment ink, pH, the viscosity and the surface tension were measured as follows. The result of the measurement is shown in Table 5.

<Measurement of pH>

The measurement of pH was performed using a pH meter (manufactured and sold by Toa Denpa Kogyo Co., Ltd.; trade name: METER MODEL HM3A) at 23° C.

<Measurement of Viscosity>

The measurement of the viscosity was performed using a viscosity measuring apparatus (manufactured and sold by Toki Sangyo Co., Ltd.; trade name: R 500 rotating viscometer) at 25° C.

<Measurement of Surface Tension>

The measurement of the surface tension was performed using a surface tension measuring apparatus (manufactured and sold by Kyowa Interface Science Co., Ltd.; trade name: CBVP-Z) and a platinum plate at 25° C. as a static surface tension.

TABLE 5

| Production Example 21 | pH | Surface Tension (25° C.) | Viscosity (25° C.) |
|---|---|---|---|
| Cyan Pigment Ink | 8.93 | 31.0 mN/m | 7.97 mPa · sec |
| Magenta Pigment Ink | 8.70 | 31.2 mN/m | 7.95 mPa · sec |
| Yellow Pigmnet Ink | 8.55 | 28.5 mN/m | 8.05 mPa · sec |
| Black Pigment Ink | 9.30 | 27.5 mN/m | 8.05 mPa · sec |

Production Example 22

Dye Ink Set

<Production of Cyan Dye Ink>

44% by mass of a C.I.Direct blue 199 (having a solid content of 10.25% by mass), 30.75% by mass of 1,3-butanediol, 10.25% by mass of glycerin, 1.8% by mass of 2,2,4-trimethyl-1,3-pentanediol, 2.2% by mass of a nonionic surfactant (polyoxy alkylene derivative), 0.2% by mass of a benzisothiazoline antiseptic and anti-fungus agent (relative to 100% by mass of the mass of the dye ink composition) and a proper amount of water were mixed and pH of the resultant mixture was adjusted with an organic amine pH controlling agent, thereby producing the cyan dye ink of Production Example 22.

<Preparation of Magenta Dye Ink>

4.5% by mass of a magenta reactive dye, 30.75% by mass of 1,3-butanediol, 10.25% by mass of glycerin, 1.5% by mass of 2-ethyl-1,3-hexanediol, 2.2% by mass of a nonionic surfactant (polyoxy alkylene derivative), 0.2% by mass of a benzisothiazoline antiseptic and anti-fungus agent (relative to 100% by mass of the mass of the dye ink composition) and a proper amount of water were mixed and pH of the resultant mixture was adjusted with an organic amine pH controlling agent, thereby producing the magenta dye ink of Production Example 22.

<Preparation of Yellow Dye Ink>

4.5% by mass of C.I.Acid Yellow 23, 30.75% by mass of 1,3-butanediol, 10.25% by mass of glycerin, 2% by mass of 2-ethyl-1,3-hexanediol, 2% by mass of a nonionic surfactant (polyoxy alkylene derivative), 0.2% by mass of a benzisothiazoline antiseptic and anti-fungus agent (relative to 100% by mass of the mass of the dye ink composition) and a proper amount of water were mixed and pH of the resultant mixture was adjusted with an organic amine pH controlling agent, thereby producing the yellow dye ink of Production Example 22.

Production Example 23

Dye Ink Set

<Production of Cyan Dye Ink>

44% by mass of a C.I.Direct blue 199 (having a solid content of 10.25% by mass), 30.75% by mass of 1,3-butanediol, 10.25% by mass of glycerin, 1.8% by mass of 2,2,4-trimethyl-1,3-pentanediol, 2.2% by mass of a nonionic surfactant (polyoxy alkylene derivative), 0.2% by mass of a benzisothiazoline antiseptic and anti-fungus agent, 0.05% by mass of a (relative to 100% by mass of the mass of the dye ink composition) and a proper amount of water were mixed and pH of the resultant mixture was adjusted with an organic amine pH controlling agent, thereby producing the cyan dye ink of Production Example 22.

<Preparation of Magenta Dye Ink>

4.5% by mass of a magenta reactive dye, 30.75% by mass of 1,3-butanediol, 10.25% by mass of glycerin, 1.5% by mass of 2-ethyl-1,3-hexanediol, 2.2% by mass of a nonionic surfactant (polyoxy alkylene derivative), 0.2% by mass of a benzisothiazoline antiseptic and anti-fungus agent, 0.05% by mass of a self-emulsifiable silicone anti-foaming agent (manufactured and sold by Shin-Etsu Chemical Co., Ltd.; trade name: KM 72F) (relative to 100% by mass of the mass of the dye ink composition) and a proper amount of water were mixed and pH of the resultant mixture was adjusted with an organic amine pH controlling agent, thereby producing the magenta dye ink of Production Example 23.

<Preparation of Yellow Dye Ink>

4.5% by mass of C.I.Acid Yellow 23, 30.75% by mass of 1,3-butanediol, 10.25% by mass of glycerin, 2% by mass of 2-ethyl-1,3-hexanediol, 2% by mass of a nonionic surfactant (polyoxy alkylene derivative), 0.2% by mass of a benzisothiazoline antiseptic and anti-fungus agent, 0.05% by mass of a self-emulsifiable silicone anti-foaming agent (manufactured and sold by Shin-Etsu Chemical Co., Ltd.; trade name: KM 72F) (relative to 100% by mass of the mass of the dye ink composition) and a proper amount of water were mixed and pH of the resultant mixture was adjusted with an organic amine pH controlling agent, thereby producing the yellow dye ink of Production Example 23.

Production Example 24

Dye Ink Set
<Production of Cyan Dye Ink>

44% by mass of a C.I.Direct blue 199 (having a solid content of 10.25% by mass), 30.75% by mass of 1,3-butanediol, 10.25% by mass of glycerin, 0.2% by mass of a benzisothiazoline antiseptic and anti-fungus agent (relative to 100% by mass of the mass of the dye ink composition) and a proper amount of water were mixed and pH of the resultant mixture was adjusted with an organic amine pH controlling agent, thereby producing the cyan dye ink of Production Example 24.

<Preparation of Magenta Dye Ink>

4.5% by mass of a magenta reactive dye, 30.75% by mass of 1,3-butanediol, 10.25% by mass of glycerin, 0.2% by mass of a benzisothiazoline antiseptic and anti-fungus agent (relative to 100% by mass of the mass of the dye ink composition) and a proper amount of water were mixed and pH of the resultant mixture was adjusted with an organic amine pH controlling agent, thereby producing the magenta dye ink of Production Example 24.

<Preparation of Yellow Dye Ink>

4.5% by mass of C.I.Acid Yellow 23, 30.75% by mass of 1,3-butanediol, 10.25% by mass of glycerin, 0.2% by mass of a benzisothiazoline antiseptic and anti-fungus agent (relative to 100% by mass of the mass of the dye ink composition) and a proper amount of water were mixed and pH of the resultant mixture was adjusted with an organic amine pH controlling agent, thereby producing the yellow dye ink of Production Example 24.

Figure 6:
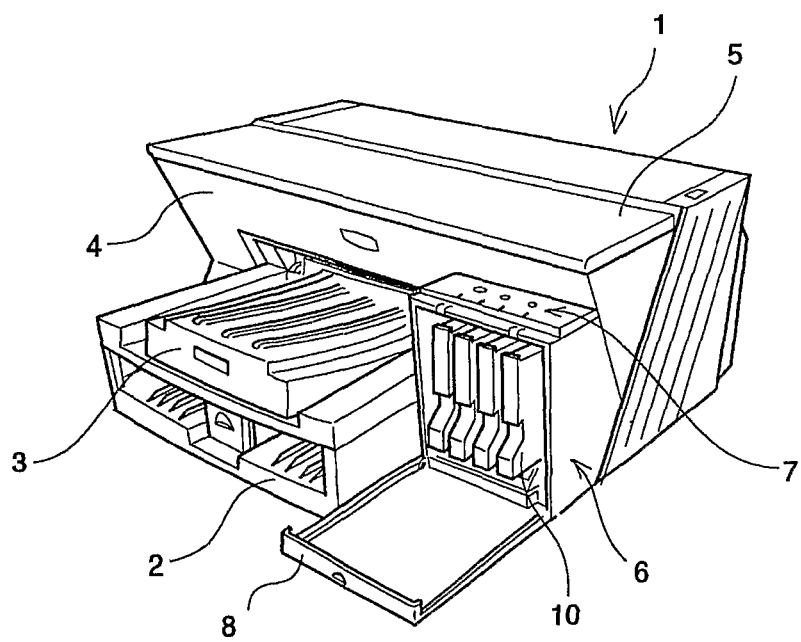
FIG. 6 is an explanatory view schematically showing an example of the inkjet recording apparatus according to the present invention.

With respect to the obtained cyan dye ink, magenta dye ink, and yellow dye ink, pH, the viscosity and the surface tension were measured as follows. The result of the measurement is shown in FIG. 6.

<Measurement of pH>

The measurement of pH was performed using a pH meter (manufactured and sold by Toa Denpa Kogyo Co., Ltd.; trade name: METER MODEL HM3A) at 23° C.

<Measurement of Viscosity>

The measurement of the viscosity was performed using a viscosity measuring apparatus (manufactured and sold by Toki Sangyo Co., Ltd.; trade name: R 500 rotating viscometer) at 25° C.

<Measurement of Surface Tension>

The measurement of the surface tension was performed using a surface tension measuring apparatus (manufactured and sold by Kyowa Interface Science Co., Ltd.; trade name: CBVP-Z) and a platinum plate at 25° C. as a static surface tension.

TABLE 6

|  | pH | Surface Tension (25° C.) | Viscosity (25° C.) |
| --- | --- | --- | --- |
| Production Example 22 |  |  |  |
| Cyan Dye Ink | 10.00 | 31.2 mN/m | 7.20 mPa · sec |
| Magenta Dye Ink | 9.85 | 32.0 mN/m | 8.00 mPa · sec |
| Yellow Dye Ink | 9.60 | 31.4 mN/m | 7.20 mPa · sec |
| Production Example 23 |  |  |  |
| Cyan Dye Ink | 10.00 | 31.0 mN/m | 7.30 mPa · sec |
| Magenta Dye Ink | 9.80 | 31.0 mN/m | 8.10 mPa · sec |
| Yellow Dye Ink | 9.70 | 30.0 mN/m | 7.30 mPa · sec |
| Production Example 24 |  |  |  |
| Cyan Dye Ink | 10.10 | 48.2 mN/m | 5.68 mPa · sec |
| Magenta Dye Ink | 9.90 | 48.2 mN/m | 5.90 mPa · sec |
| Yellow Dye Ink | 9.60 | 48.0 mN/m | 5.60 mPa · sec |

Production Example 25

Production of Yellow Dye Ink

The yellow dye ink of Production Example 25 was produced in substantially the same manner as in Production Example 22, except that in the ink composition, an organic amine pH controlling agent was not incorporated.

Production Example 26

Production of Yellow Dye Ink

The yellow dye ink of Production Example 26 was produced in substantially the same manner as in Production Example 22, except that the pH of the ink composition was adjusted to an objective pH with an acid (1N aqueous solution of hydrochloric acid).

Production Example 27

Production of Yellow Dye Ink

The yellow dye ink of Production Example 27 was produced by mixing the yellow dye ink of Production Example 25 and the yellow dye ink of Production Example 26 so that the pH of the yellow dye ink of Production Example 27 becomes an objective pH.

With respect to the yellow dye inks produced in Production Examples 25 to 27, pH was measured in substantially the same manner as in Production Example 22. The result of the measurement is shown in Table 7.

TABLE 7

|  |  | pH |
| --- | --- | --- |
| Production Example 25 | Yellow Dye Ink | 8.55 |
| Production Example 26 | Yellow Dye Ink | 5.50 |
| Production Example 27 | Yellow Dye Ink | 7.50 |

Examples 17 to 22 and Reference Examples 1 to 3

Next, as shown in the following Tables 8 and 9, the dye ink and the pigment ink were filled respectively in a cartridge and another cartridge of an inkjet printer (manufactured and sold by Ricoh Company, Ltd.; trade name: IPSiO G 707).

TABLE 8

|  | Pigment Ink Type* | | Dye Ink Type* | |
|---|---|---|---|---|
| Example 17 | Pro. Ex. 21 | Cyan | Pro. Ex. 22 | Cyan |
| Example 18 | Pro. Ex. 21 | Magenta | Pro. Ex. 22 | Magenta |
| Example 19 | Pro. Ex. 21 | Yellow | Pro. Ex. 22 | Yellow |
| Example 20 | Pro. Ex. 21 | Cyan | Pro. Ex. 23 | Cyan |
| Example 21 | Pro. Ex. 21 | Magenta | Pro. Ex. 23 | Magenta |
| Example 22 | Pro. Ex. 21 | Yellow | Pro. Ex. 23 | Yellow |
| Reference Example 1 | Pro. Ex. 21 | Yellow | Pro. Ex. 25 | Yellow |
| Reference Example 2 | Pro. Ex. 21 | Yellow | Pro. Ex. 26 | Yellow |
| Reference Example 3 | Pro. Ex. 21 | Yellow | Pro. Ex. 27 | Yellow | wherein "Type*" means, for example that in Example 17, as the pigment ink, the pigment ink produced in Pro. Ex. 21 (Production Example 21) was used and as the dye ink, the dye ink produced in Pro. Ex. 22 (Production Example 22) was used.

TABLE 9

|  | Pigment Ink | | Dye Ink | | |
|---|---|---|---|---|---|
|  | pH | Viscosity (mPa·s) | pH | Viscosity (mPa·s) | Surface Tension (mN/m) |
| Example 17 | 8.93 | 7.97 | 10.00 | 7.20 | 31.2 |
| Example 18 | 8.70 | 7.95 | 9.85 | 8.00 | 32.0 |
| Example 19 | 8.55 | 8.05 | 9.60 | 7.20 | 31.4 |
| Example 20 | 8.93 | 7.97 | 10.00 | 7.30 | 31.0 |
| Example 21 | 8.70 | 7.95 | 9.80 | 8.10 | 31.0 |
| Example 22 | 8.55 | 8.05 | 9.70 | 7.30 | 30.0 |
| Reference Example 1 | 8.55 | 8.05 | 8.55 | — | — |
| Reference Example 2 | 8.55 | 8.05 | 5.50 | — | — |
| Reference Example 3 | 8.55 | 8.05 | 7.50 | — | — |

<Evaluation>

In Examples 17 to 22 and Reference Examples 1 to 3, the printing using the pigment ink and the dye ink properly alternately through one head (with proviso that as the cartridge, a cartridge for the pigment ink and another cartridge for the dye ink were separately used) was performed by means of an inkjet printer (manufactured and sold by Ricoh Company, Ltd.; trade name: IPSiO G707) in a plain paper (Ricoh Type 6200) and in a glossy paper (Ricoh silky glossy paper) respectively.

As the result of the printing, in Examples 17 to 22 and Reference Example 1, with respect to every one of the used pigment inks and dye inks, the printing with a high image quality could be obtained. In the comparison of the dye ink with the pigment ink, the dye ink has caused the show-through of the printed image more frequently than the pigment ink and was a little poorer than the pigment ink in the light resistance and the water resistance, when the printing was performed in the plain paper. On the other hand, when the printing was performed in the glossy paper, a photograph image obtained using the dye ink had more glossy feeling than a photograph image obtained using the pigment ink.

In Examples 17 to 22 and Reference Example 1, after the printing was performed using the pigment ink, the inside of the ink path in which the pigment ink has flown was cleaned with 20 ml of the carrier (a mixture of 10 parts by mass of glycerin, 20 parts by mass of 1,3-butanediol and a proper amount of water, which was pH-adjusted by sodium hydroxide to pH 9) and the printing was performed using the dye ink instead of the pigment ink, so that the clogging of the ink in the inside of the ink path was not caused.

After the printing was performed using the pigment ink and the dye ink properly alternately, while in the receiver for the blanc-delivery of the ink, a slight amount of the pigment ink remained, not a larger amount of the solid adherent substance has remained than that of the printing using the pigment ink or the dye ink individually. Further, when one of the dye inks of Examples 17 to 22 and Reference Example 1 was directly mixed with one of the pigment inks of Examples 17 to 22 and Reference Example 1, large particles were not caused in the mixed inks.

On the other hand, in Reference Example 2, when after the printing was performed using the pigment ink and the inside of the ink path was cleaned with the above-noted carrier, the printing was performed using the dye ink instead of the pigment ink, the omission of the ink injecting due to the nozzle trouble which is considered to be caused by the clogging of the ink (which may by due to the cause of large particles) was frequently caused. As mentioned below, when the dye ink of Reference Example 2 was directly mixed with the pigment ink of Reference Example 2, large particles were caused in the mixed inks. The above-noted clogging may be caused by the remaining pigment ink in anywhere of the ink path even after the cleaning. Needless to say, the continuous printing after changing the pigment ink to the dye ink without cleaning affects adversely the clogging of the ink.

In Reference Example 3, the printing was performed using at first the pigment ink and then the dye ink, a little turbulence of the ink injecting was caused.

(Experiment)

With the yellow dye ink of Production Example 22 and the yellow dye inks of Production Examples 25 to 27 respectively, 5% by mass of the yellow pigment ink of Production Example 1, based on the mass of the dye ink, was mixed and with respect to each of the mixed inks, the particle size distribution was measured using a particle size distribution measuring apparatus (manufactured and sold by Nikkiso Co., Ltd.; trade name: Microtrack UPA). The result of the measurement is shown in FIG. 20.

Figure 20:
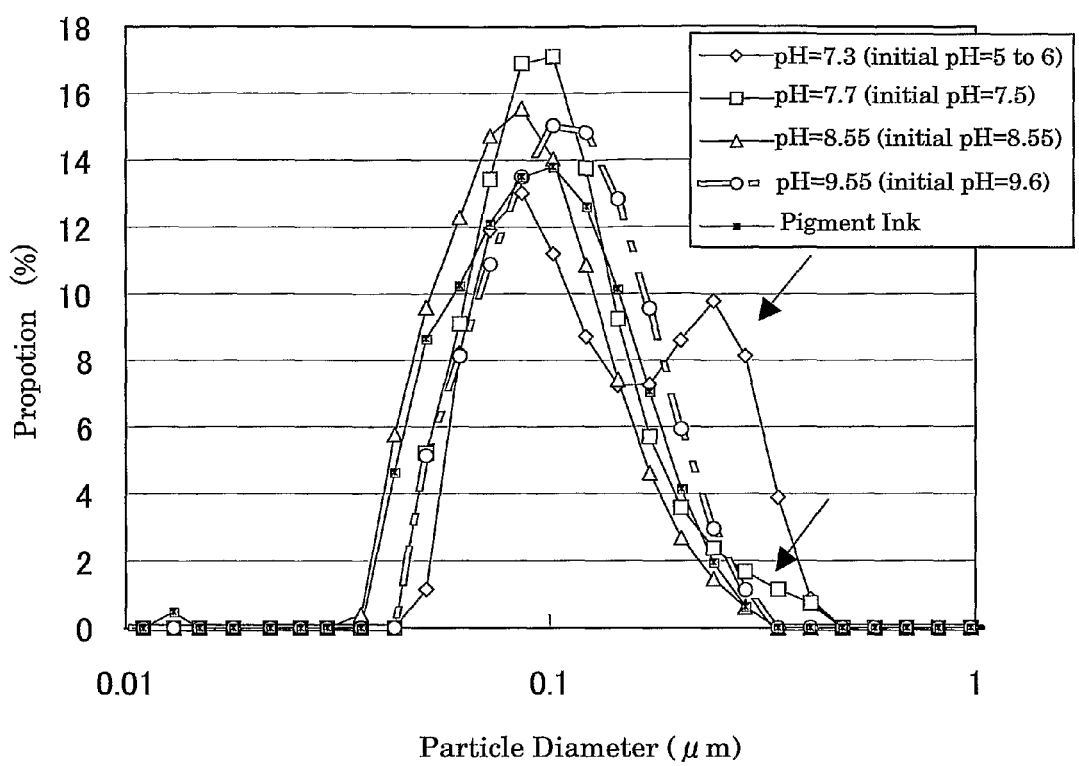
FIG. 20 is a graph showing an example of the particle size distribution in a mixture of a dye ink and a pigment ink in Examples.

From the result shown in FIG. 20, it is confirmed that when with the yellow dye ink of Production Example 27, a little amount of the pigment ink having pH which is higher than that of the mixed inks produced by mixing the dye ink of Production Example 27 and the above-noted pigment ink by 0.85 of pH (before the mixing, the dye ink has pH which is lower than that of the pigment ink by 1.05 of pH) was mixed, large particles were caused.

The mixing of the yellow dye ink of Production Example 22 or 25 with the pigment ink having pH which is the same as or lower than the dye ink of Production Example 22 or Production Example 25, has caused no problem.

FIG. 20 shows an example of the mixing of 5% by mass of the pigment ink with the dye ink, based on the mass of the dye ink; however, when a much smaller amount of the pigment ink is mixed with the dye ink, almost no change is caused in pH of the dye ink and a little amount of the pigment ink is caused to be large particles. In FIG. 20, an initial pH indicates pH of the dye ink before the mixing and another pH noted before the initial pH indicates pH of the mixed inks of the pigment ink and the dye ink.

On the other hand, when the pigment ink and the dye ink are mixed in the mass ratio of 1/1, pH of the mixed inks is similar to that of the pigment ink, so that a remarkable adverse effect is not observed (with proviso that pH of the pigment ink is relative high (7.5 or higher)).

However, with respect to the inkjet recording, since the mixing of the both inks is performed during injecting the both inks, there is always caused a place where a little amount of the pigment ink is mixed with a large amount of the dye ink in the ink flow path, so that it is considered that when at that place, once large particles are caused, the reliability of the ink injecting is adversely affected.

Further, with respect to the inkjet recording, when after cleaning the ink path, a little part where is unsatisfactory cleaned remains, due to the mixing of the remaining ink with another ink, large particles are caused, so that the ink injecting is frequently adversely affected. However, it is confirmed that by using the dye ink having pH which is higher than that of the pigment ink, even without the cleaning of the ink path, large particles due to the mixing of the inks is not caused.

<Evaluation for Ink-misdetection of Electrode>

In the above-noted inkjet printer (manufactured and sold by Ricoh Company, Ltd.; trade name: IPSiO G 707), the presence of the ink is detected by measuring the electric resistance using the electrodes and according to the detecting of the absence of the ink, the ink is supplemented in the sub tank. When the dye ink comprising no anti-foaming agent of Production Example 22 was used, the misdetection (the mistaking the state in which the ink is yet present for the state in which the ink is already absent) was often caused. It is assumed that the cause of the misdetection is an ink foam attached to the electrode. Thus, when the dye ink comprising 0.05% by mass of a silicone anti-foaming agent of Production Example 23 was used, the misdetection was lessened.

With respect to the dye inks of Production Example 22 and 23, the ink was subjected to the 5-minutes foaming stability test according to JIS K3362.

As the result of the test, it was found that each of the cyan dye ink, magenta dye ink and yellow dye ink of Production Example 22 has a 5-minutes foaming stability degree of about 30 mm or more and on the other hand, each of the cyan dye ink, magenta dye ink and yellow dye ink of Production Example 23 has a 5-minutes foaming stability degree of 10 mm or less.

<Evaluation for Flowability of Ink during Blanc-Delivery>

With respect to a combination of the dye ink of Production Example 22 and the pigment ink of Production Example 24 or the dye ink of Production Example 24 and the pigment ink of Production Example 21 as the combination of the dye ink and pigment ink which are used properly alternately in the printing, the blanc-delivery (the action in which for maintaining the stable injecting of the ink, after the surface of the inkjet head stained by the using is scraped with the blade, the dirt which has invaded in the nozzle is blown off) was performed.

In the case where the combination of the dye ink of Production Example 22 and the pigment ink of Production Example 21 was used, only a slight amount of the pigment ink has remained.

On the other hand, in the case where the combination of the dye ink of Production Example 24 and the pigment ink of Production Example 21 was used, a large mass of the pigment ink was blown off into the receiver for the blanc-delivery. With respect to the pigment ink having a large surface tension, such as that of Production Example 24, the formed image has a low drying rate and the feathering of the formed image in the plain paper is easily caused.

The recording ink according to the present invention is a recording ink having excellent color developing properties and high delivery stability which is used for the inkjet recording performed using a dye ink and a pigment ink properly alternately through one inkjet head and by which not only the color saturation of the obtained image can be remarkably improved, but also the image having a high quality can be formed and the recording ink can be preferably applied to an ink cartridge, an ink record, an inkjet recording apparatus and an inkjet recording process.

The recording ink according to the present invention comprises a dye ink having a high viscosity, which is used for an inkjet apparatus comprising an inkjet head having a train of nozzles, a sub tank feeding the ink to the inkjet head, a negative-pressure generating unit which generates a negative pressure in the sub tank, an opening unit to the atmosphere by which the inside of the sub tank is opened to the atmosphere and a detecting unit by which the presence of the ink is detected by the difference in the electrical resistance and the recording ink can be preferably applied to an ink cartridge, an ink record, an inkjet recording apparatus and an inkjet recording process.

The invention claimed is:

1. An inkjet recording method comprising:
performing inkjet recording alternately using a dye ink and a pigment ink through one inkjet head,
wherein the dye ink and the pigment ink have respectively a viscosity at 25° C. of 5 mPa·s or more and the difference between the viscosity of the dye ink and the viscosity of the pigment ink is 3 mPa·s or less,
wherein pH of the dye ink (pH B) is higher than pH of the pigment ink (pH A),
wherein the difference (pH B-pH A) between pH of the pigment ink (pH A) and pH of the dye ink (pH B) is from 1 to 2,
wherein the dye ink and the pigment ink each has an alkaline pH, and
wherein the pigment ink has pH buffer properties in a pH region of 6 to 9.

2. The inkjet recording method according to claim 1,
wherein the pigment ink comprises at least water, a pigment, a wetting agent, a surfactant, and a polyol compound having a carbon number of 8 to 11 or a glycol ether compound, and has a viscosity at 25° C. of 5 mPa·s or more and a surface tension at 25° C. of 40 mN/m or less.

3. The inkjet recording method according to claim 2,
wherein the pigment ink is at least one selected from the group consisting of polymer fine particles comprising at least one of a water-insoluble colorant and a water-slight soluble colorant and a carbon black having at least one of hydrophilic groups in the surface thereof.

4. The ink jet recording method according to claim 1,
wherein inkjet recording is performed using an inkjet recording apparatus comprising:
an inkjet head having a train of nozzles,
a sub tank feeding ink to the inkjet head,
a negative-pressure generating unit which generates a negative pressure in the sub tank,
an opening unit to the atmosphere by which the inside of the sub tank is opened to the atmosphere and
a detecting unit by which the presence of the ink is detected through the difference in the electric resistance.

5. The inkjet recording method according to claim 4,
wherein the inkjet recording apparatus comprises a scraping unit by which an adhered ink is scraped off into the receiver for blanc-delivery.

6. The inkjet recording method according to claim 1,
wherein the dye ink comprises water, a dye, a wetting agent, a viscosity-enhancing agent, and a polyol compound having a carbon number of 8 to 11 or a glycol ether compound, and has a viscosity at 25° C. of 5 mPa·s or more and a surface tension at 25° C. of 40 mN/m or less.

7. The inkjet recording method according to claim 6, wherein the wetting agent is at least one of glycerine, 1,3-butanediol, triethylene glycol, 1,6-hexanediol, propylene glycol, 1,5-pentanediol, diethylene glycol, dipropylene glycol, trimethylol propane, 1,1,1-tris(hydroxylmethyl) propane and trimethylol ethane.

8. The inkjet recording method according to claim 6, wherein the amount of the wetting agent in the dye ink is 35% by mass to 50% by mass.

9. The inkjet recording method according to claim 6, wherein the viscosity-enhancing agent is at least one of a surfactant and an alginic acid compound.

10. The ink jet recording method according to claim 9, wherein the surfactant is present and is at least one of an anionic surfactant and a nonionic surfactant.

11. The inkjet recording method according to claim 10, wherein the amount of the surfactant in the dye ink is 7% by mass or more.

12. The inkjet recording method according to claim 6, wherein the amount of the dye in the dye ink is 4% by mass or more.

13. The inkjet recording method according to claim 6, wherein the dye ink comprises a silicone anti-foaming agent.

14. The inkjet recording method according to claim 13, wherein the silicone anti-foaming agent is one of a self-dispersible silicone anti-foaming agent and an emulsion silicone anti-foaming agent.

15. The inkjet recording method according to claim 1, wherein the inks are at least one selected from the group consisting of a cyan ink, a magenta ink, a yellow ink and a black ink.

16. An inkjet cartridge adapted for use in the inkjet recording method according to claim 1 comprising:
an ink encapsulated in a container.

17. The inkjet cartridge according to claim 16, wherein the capacity of the ink cartridge is 15 g or more of an ink.

18. An inkjet recording apparatus comprising:
an ink ejecting unit,
wherein the ink ejecting unit forms an image by applying a stimulation to an ink used in the inkjet recording method according to claim 1 and ejecting the ink.

19. The inkjet recording apparatus according to claim 18, wherein the stimulation is at least one selected from the group consisting of heat, pressure, vibration and light.

20. The inkjet recording apparatus according to claim 18, wherein the ink ejecting unit comprises an inkjet head comprising plural trains of nozzles and a sub tank holding a liquid fed from a tank for storing a liquid and feeding a liquid to the inkjet head.

21. The inkjet recording apparatus according to claim 20, wherein the sub tank comprises a negative-pressure generating unit by which a negative pressure is generated in the sub tank, an opening unit to the atmosphere by which the inside of the sub tank is opened to the atmosphere and a detecting unit of the ink by which the presence of the ink is detected through the difference of the electrical resistance.

22. The inkjet recording apparatus according to claim 18, wherein the inkjet recording apparatus comprises a scraping unit scraping off an adhered ink in a receiver for blanc-delivery.

23. The inkjet recording apparatus according to claim 22, wherein the scraping unit is one of a wiper and a cutter.

24. An ink record comprising:
an image formed on a recording medium obtained by the inkjet recording method according to claim 1.

25. The inkjet recording method according to claim 1, wherein the pigment ink is a colored pigment ink.

* * * * *